United States Patent
Tanaka et al.

(10) Patent No.: US 9,241,037 B2
(45) Date of Patent: Jan. 19, 2016

(54) SERVER DEVICE, BEHAVIOR PROMOTION AND SUPPRESSION SYSTEM, BEHAVIOR PROMOTION AND SUPPRESSION METHOD, AND RECORDING MEDIUM

(75) Inventors: Rie Tanaka, Tokyo (JP); Shinichi Doi, Tokyo (JP); Satoko Itaya, Tokyo (JP); Taku Konishi, Tokyo (JP); Naoki Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 13/997,525

(22) PCT Filed: Dec. 13, 2011

(86) PCT No.: PCT/JP2011/078777
§ 371 (c)(1),
(2), (4) Date: Jun. 24, 2013

(87) PCT Pub. No.: WO2012/090697
PCT Pub. Date: Jul. 5, 2012

(65) Prior Publication Data
US 2013/0275514 A1   Oct. 17, 2013

(30) Foreign Application Priority Data
Dec. 28, 2010   (JP) .................................. 2010-292533

(51) Int. Cl.
*G06F 15/16* (2006.01)
*H04L 29/08* (2006.01)
*G06Q 30/02* (2012.01)

(52) U.S. Cl.
CPC ............... *H04L 67/22* (2013.01); *G06Q 30/02* (2013.01)

(58) Field of Classification Search
CPC .............................. G06Q 30/02; H04L 67/22

USPC .................................................... 709/204, 205
See application file for complete search history.

(56) References Cited

U.S. PATENT DOCUMENTS

2007/0276735 A1* 11/2007 Naito ..................... G06Q 30/02
                                                              705/14.58
2009/0006286 A1*  1/2009 Angell .............. G06K 9/00771
                                                               706/12

FOREIGN PATENT DOCUMENTS

JP   10-113343 A   5/1998
JP   10-305016 A   11/1998
(Continued)

OTHER PUBLICATIONS

Kirigamine Project Team, ed., "Kankorojii Nyūmon", Kodansha Scientific, 1973, pp. 57-63. Concise English language explanation provided in Applicant's specification beginning at paragraph [0010].

(Continued)

*Primary Examiner* — Dustin Nguyen
*Assistant Examiner* — Joel Mesa

(57) ABSTRACT

A behavior information acquirer (11) acquires behavior information representing the behavior of a user detected by a behavior detector (21), and stores the behavior information in a behavior information memory (12). How the influence of the behavior of the user indicated by the behavior information acquired by the behavior information acquirer (11) will spread over a network of mutual information is calculated from mutual information, user information, and a behavior list respectively stored in a mutual information memory (13), a user information memory (14), and a behavior information memory (12). A presentation information generator (16) generates presentation information depicting the way in which the influence of the behavior of the user indicated by the behavior information acquired by the behavior information acquirer (11) propagates to other users, and transmits the presentation information to a terminal device (2B).

16 Claims, 18 Drawing Sheets

(56) References Cited

FOREIGN PATENT DOCUMENTS

| | | |
|---|---|---|
| JP | H10-307864 A | 11/1998 |
| JP | 2003-228800 A | 8/2003 |
| JP | 2008-217621 A | 9/2008 |
| JP | 2009-116844 A | 5/2009 |
| JP | 2009-157837 A | 7/2009 |
| JP | 2010-146276 A | 7/2010 |
| JP | 2010-198243 A | 9/2010 |
| JP | 2010-204883 A | 9/2010 |
| WO | 2006/085383 A1 | 8/2006 |

OTHER PUBLICATIONS

Tsutomu Nakarai et al., "Research of Measures Against Nosocomial Infection using RFID", IPSJ SIG Notes, Heisei 21 Nendo [CD-ROM], Oct. 15, 2009, pp. 1-8. Concise English language explanation provided in ISR.

Kohei Tanaka et al., "Implementation and Actual Use of Collection Boxes utilizing Information Technology to Encourage Donations", IPSJ SIG Notes, Heisei 21 Nendo [CD-Rom], Jun. 15, 2009, pp. 1-8. Concise English language explanation provided in ISR.

International Search Report for PCT Application No. PCT/JP2011/078777 mailed on Mar. 19, 2012.

Japanese Office Action for JP Application No. 2012-550811 mailed on Aug. 4, 2015 with English Translation.

Yasuhiro Kanatani et al., "Shingata Influenza ni Taisuru Pandemic Taisaku Program to Project Bunseki", Operations Research as a Management Science Research, Dec. 1, 2008, vol. 53, No. 12, pp. 9-13. See cited doc. on p. 1 of translated International Search Report for explanation of relevance.

* cited by examiner

FIG.2

| DATA ID | USER ID | DATE AND TIME | PLACE | BEHAVIOR |
|---------|---------|---------------|-------|----------|
| 01 | A | 2010/11/25 12:00 | IN FRONT OF MONEY DONATION BOX | STOOD IN FRONT OF MONEY DONATION BOX |
| 02 | A | 2010/11/25 12:02 | IN FRONT OF MONEY DONATION BOX | DONATED MONEY |
| 03 | B | 2010/11/26 15:10 | IN FRONT OF VENDING MACHINE | BOUGHT A CANNED DRINK |
| 04 | B | 2010/11/26 15:15 | IN FRONT OF GARBAGE BIN | SEPARATED AND THREW AWAY AN EMPTY CAN |
| ⋮ | ⋮ | ⋮ | ⋮ | ⋮ |

FIG.3

| PRESENT BEHAVIOR | POSSIBLE BEHAVIOR | CATEGORY |
|---|---|---|
| BUY A CANNED DRINK | SEPARATE AND THROW AWAY AN EMPTY CAN | ENVIRONMENTAL ACTIVITY |
| BUY A CANNED DRINK | THROW AWAY AN EMPTY CAN INTO A GARBAGE BIN | ORDINARY BEHAVIOR |
| BUY A CANNED DRINK | CARELESSLY THROW AWAY AN EMPTY CAN | DEVIANT BEHAVIOR |
| BE IN FRONT OF MONEY DONATION BOX | DONATE MONEY | SOCIAL CONTRIBUTION |
| BE IN FRONT OF MONEY DONATION BOX | PASS BY | ORDINARY BEHAVIOR |
| ⋮ | ⋮ | ⋮ |

FIG.5

| USER 1 | USER 2 | DEGREE OF INFLUENCE | IMPLEMENTATION TIME | CATEGORY |
|---|---|---|---|---|
| A | B | 0.5 | 0.5 DAYS | ORDINARY BEHAVIOR |
| A | B | 0.8 | 1 DAY | DEVIANT BEHAVIOR |
| A | B | 0.5 | 1 DAY | SOCIAL CONTRIBUTION |
| A | B | 0.5 | 2.5 DAYS | ENVIRONMENTAL ACTIVITY |
| A | C | 0.6 | 0.5 DAYS | ORDINARY BEHAVIOR |
| A | C | 0.6 | 1 DAY | DEVIANT BEHAVIOR |
| A | C | 0.6 | 0.5 DAYS | SOCIAL CONTRIBUTION |
| A | C | 0.7 | 1 DAY | ENVIRONMENTAL ACTIVITY |
| A | D | 0.2 | 0.5 DAYS | ORDINARY BEHAVIOR |
| A | D | 0.0 | ZERO DAYS | DEVIANT BEHAVIOR |
| A | D | 0.8 | 1 DAY | SOCIAL CONTRIBUTION |
| A | D | 0.6 | 0.5 DAYS | ENVIRONMENTAL ACTIVITY |
| ⋮ | ⋮ | ⋮ | ⋮ | ⋮ |

SERVER DEVICE, BEHAVIOR PROMOTION AND SUPPRESSION SYSTEM, BEHAVIOR PROMOTION AND SUPPRESSION METHOD, AND RECORDING MEDIUM

This application is a National Stage Entry of PCT/JP2011/078777 filed Dec. 13, 2011, which claims priority from Japanese Patent Application 2010-292533 filed Dec. 28, 2010, the contents of all of which are incorporated herein by reference, in their entirety.

TECHNICAL FIELD

The present invention relates to a server device, a behavior promotion and suppression system, a behavior promotion and suppression method, and a recording medium with which a behavior of a user is promoted or suppressed.

BACKGROUND ART

A user carries out a variety of behaviors during daily life, and many of these behaviors influence other people. Other users who have seen a certain user carrying out a behavior often carry out the same behavior. For example, there are cases in which another user who has seen a certain user cleaning when using a public place also cleans after using the same place. Conversely, there are also cases in which another user who has seen a certain user throwing away an empty can onto the street also throws away an empty can in the same manner. In this way, when another user who has seen the behavior of a certain user and has a connection with the user carries out a similar behavior, it is inferred that the behavior of the certain user has influenced the another user.

Furthermore, it is thought that the behavior of the certain user influences the another user not only when the another user has directly seen the certain user carrying out the behavior but also when the another user has seen the result of the behavior of the certain user. For example, there are cases in which a user who has seen a place that has been cleaned by the previous user also wants to maintain the cleanliness of that place, or there are cases in which a user who has seen that an empty can has been thrown away also throws away an empty can.

With regard to the example of an empty can, it has actually been reported as the result of a study that when somebody throws away an empty can in a place other than a specified place, there is an increase in cases where somebody else who next comes to that place similarly throws away an empty can in that place. This is said to be because the psychological resistance with respect to throwing away an empty can weakens as the degree to which a person feels that their action of throwing away an empty can worsens the environment decreases due to an empty can having already been thrown away (Non Patent Literature 1).

In this way, the everyday behavior of a user and the results thereof influence other users; yet, there are not many ways in which the user is able to realize this. In the abovementioned examples, the user did not know that another user has cleaned after the user had cleaned, and the user was not able to perceive that throwing away an empty can became the trigger for the similar behavior of another user. If the user knew that it is possible for his or her selfless behavior such as in the former example to induce the selfless behavior of another user, there is a possibility of the selfless behavior of the user being promoted. Conversely, if the user knew that his or her selfish behavior has become the trigger for the selfish behavior of another user, there is a possibility of the selfish behavior of the user being suppressed. In this way, the user knowing what kind of influence his or her behavior will possibly have on other users thereafter becomes a catalyst for changing the behavior of that user.

As an example of technology that notifies a user of what another person has thought upon seeing a behavior of the user or the result thereof after the user has carried out the behavior, in Patent Literature 1 for example, a system is proposed in which a user inputs an image of a behavior to be carried out by the user, the user writes the result of carrying out the behavior in a diary, and the user receives feedback in the form of comments from other users who have seen the diary. Furthermore, as an example of technology that predicts how the future will turn out if a user carries out behaviors in accordance with a schedule, in Patent Literature 2 for example, technology is proposed in which biometric data such as the brain waves and body temperature of the user and environment data such as air temperature and air pressure are analyzed in combination with a list of past behaviors, a comparison is made with the future schedule of the user, and advice is given as to what kind of health condition will be attained if the user carries out behaviors according to that schedule.

In Patent Literature 3, an electronic computer is presented which computes a social network configuration model that takes into account the influence that communication over the social network has on the consumption behavior of a consumer. In Patent Literature 4, a behavior prediction system is presented in which the present condition of a user is analyzed, and behavior candidates which are candidates for the next behavior of the user are generated on the basis of behavior history information. This behavior prediction system learns from user selection results or behavior results, and controls the generation of behavior candidates on the basis of the learning results and the present condition of the user.

In Patent Literature 5, a behavior promotion and suppression system is presented in which the behavior of a user is promoted by presenting information as to his or her (the user) position among all users, and information as to the present condition of other users (rivals) in the vicinity of the his or her position. In Patent Literature 6, a recognition device is presented which extracts a feature quantity indicating a change in the state of a subject, and uses a feature quantity database to automatically recognize the action or behavior indicated by the feature quantity.

CITATION LIST

Patent Literature

Patent Literature 1: Unexamined Japanese Patent Application Kokai Publication No. 2008-217621
Patent Literature 2: Unexamined Japanese Patent Application Kokai Publication No. H10-305016
Patent Literature 3: Unexamined Japanese Patent Application Kokai Publication No. 2009-116844
Patent Literature 4: Unexamined Japanese Patent Application Kokai Publication No. 2010-146276
Patent Literature 5: Unexamined Japanese Patent Application Kokai Publication No. 2010-204883
Patent Literature 6: Unexamined Japanese Patent Application Kokai Publication No. H10-113343

Non-Patent Literature

Non Patent Literature 1: Kirigamine Project Team, ed., "Kankorojii Nyumon", Kodansha Scientific, 1973

SUMMARY

Technical Problem

If the technologies presented in Patent Literatures 1 or 2 are employed, a user is able to know how members of the same group or friends have evaluated the results of his or her behavior, and is able to know what kind of influence his or her behavior will have on the user him or herself in the future. However, these technologies take into account only the influence on and feedback to the user him or herself or a predetermined other party such as a person who is socially close to the user. In contrast to this, in practice, the behavior of the user influences friends, the behaviors of those friends influence yet more friends, and in this way the influence of the behavior of one person often propagates and spreads. For example, when influence propagates such as in the case of a user donating money and another user who has seen the user donating money then similarly donating money, and yet another user who has seen this then also donating money, it is conceivable for the result to be that the sum of the money donated reaches tens of thousands of yen in total, and several children are saved due to these donations.

In addition, in the empty can example, a user throws away an empty can in a place other than a specified place, another user who has seen this also throws away an empty can, these behaviors are repeated, and an effect is conceivable in that it becomes common practice to throw away empty cans in that place and finally a large quantity of empty cans pile up and become an inconvenience to everybody. Although the influence decreases the further away the influence is from the user who is the source, by presenting the way in which the user influences other people who are unknown to the user and are far away from the user, the user is able to know that his or her behaviors have an influence of an unexpectedly large range. As a result of this, there is a possibility that the user will reconsider the behavior the user intends to carry out from thereon, and change the behavior. Calculations of these kinds of behavioral influences cannot be carried out by means of the technology presented in Patent Literatures 1 and 2 in which the range of influence is predetermined.

The technologies presented in Patent Literatures 3, 4, and 6 do not promote or suppress the behavior of a user. The technology presented in Patent Literature 5 does not promote the selfless behavior of a user, and does not suppress selfish behavior.

The present invention takes into account the abovementioned circumstances, and an exemplary object thereof is to provide a server device, a behavior promotion and suppression system, a behavior promotion and suppression method, and a recording medium that are effective in the promotion or suppression of a behavior of a user.

Solution to Problem

A server device according to a first exemplary aspect of the present invention includes:

a behavior list memory that stores a behavior list indicating combinations of behaviors and subsequent possible behaviors of a user;

a mutual information memory that stores mutual information representing connections between users;

a user information memory that stores user information representing an influence of a behavior of the users;

a behavior information that acquires behavior information including information representing a behavior carried out by the user and information identifying the user;

an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior; and a presenter that generates presentation information including the influence the behavior in question has on the another user in the case the user has carried out the subsequent possible behavior, the influence having been calculated by the influence calculator, and presents the presentation information to the user.

A behavior promotion and suppression system according to a second exemplary aspect of the present invention includes:

a terminal device provided with a behavior detector that detects a behavior carried out by a user, generates behavior information including information representing the behavior carried out by the user and information identifying the user, and transmits the behavior information to a server device; and the server device including
a behavior list memory that stores a behavior list indicating combinations of behaviors and subsequent possible behaviors of the user,
a mutual information memory that stores mutual information representing connections between users,
a user information memory that stores user information representing an influence of a behavior of the users,
a behavior information acquirer that acquires the behavior information from the terminal device,
an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior, and
presenter that generates presentation information including the influence the behavior in question has on the another user in the case the user has carried out the subsequent possible behavior, the influence having been calculated by the influence calculator, and presents the presentation information to the user.

A behavior promotion and suppression method according to a third exemplary aspect of the present invention includes the following step to be executed by a terminal device:

a behavior detection step in which a behavior carried out by a user is detected, behavior information including information representing the behavior carried out by the user and information identifying the user is generated and transmitted to a server device; and the following steps to be executed by the server device:

a behavior information acquisition step in which the behavior information is acquired from the terminal device;

an influence calculation step in which a subsequent possible behavior of the user who has carried out the behavior indicated in the behavior information acquired in the behavior information acquisition step is acquired from a behavior list indicating combinations of behaviors and subsequent possible behaviors of the user and stored by a behavior list memory, and in which the influence the behavior in question has on another user who has a connection with the user and has seen the behavior in question or the result thereof in the case the user has carried out the subsequent possible behavior is calculated on the basis of the mutual information that is stored by a mutual information memory and represents a connection between the users and the user information that is stored by a user information memory and represents an influence of a behavior of the users, the influence including a percentage at which it is inferred that the another user carries out a similar behavior; and a presentation step in which presentation information including the influence the behavior in question has on the another user in the case the user has carried out the subsequent possible behavior is generated, the influence having been calculated in the influence calculation step, and the presentation information is presented to the user.

A recording medium according to a fourth exemplary aspect of the present invention is a computer-readable recording medium storing a program causing a computer to function as:

a behavior list memory that stores a behavior list indicating combinations of behaviors and subsequent possible behaviors of a user;

a mutual information memory that stores mutual information representing connections between users;

a user information memory that stores user information representing an influence of a behavior of the users;

a behavior information acquirer that acquires behavior information including information representing a behavior carried out by the user and information identifying the user;

an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior; and a presenter that generates presentation information including the influence the behavior in question has on the another user in the case the user has carried out the subsequent possible behavior, the influence having been calculated by the influence calculator, and presents the presentation information to the user.

Advantageous Effects of Invention

According to the present invention, it is possible to present the influence a potential future behavior of a user has on another person, which is promising in terms of being effective for the promotion or suppression of the behavior of the user.

BRIEF DESCRIPTION OF DRAWINGS

FIG. 2 is a drawing depicting an example of behavior information stored in a behavior information memory according to Mode of Embodiment 1;

FIG. 3 is a drawing depicting an example of a behavior list stored in a behavior information memory according to Mode of Embodiment 1;

FIG. 5 is a drawing depicting an example of user information stored in a user information memory according to Mode of Embodiment 1;

EXEMPLARY EMBODIMENTS

Figure 1:
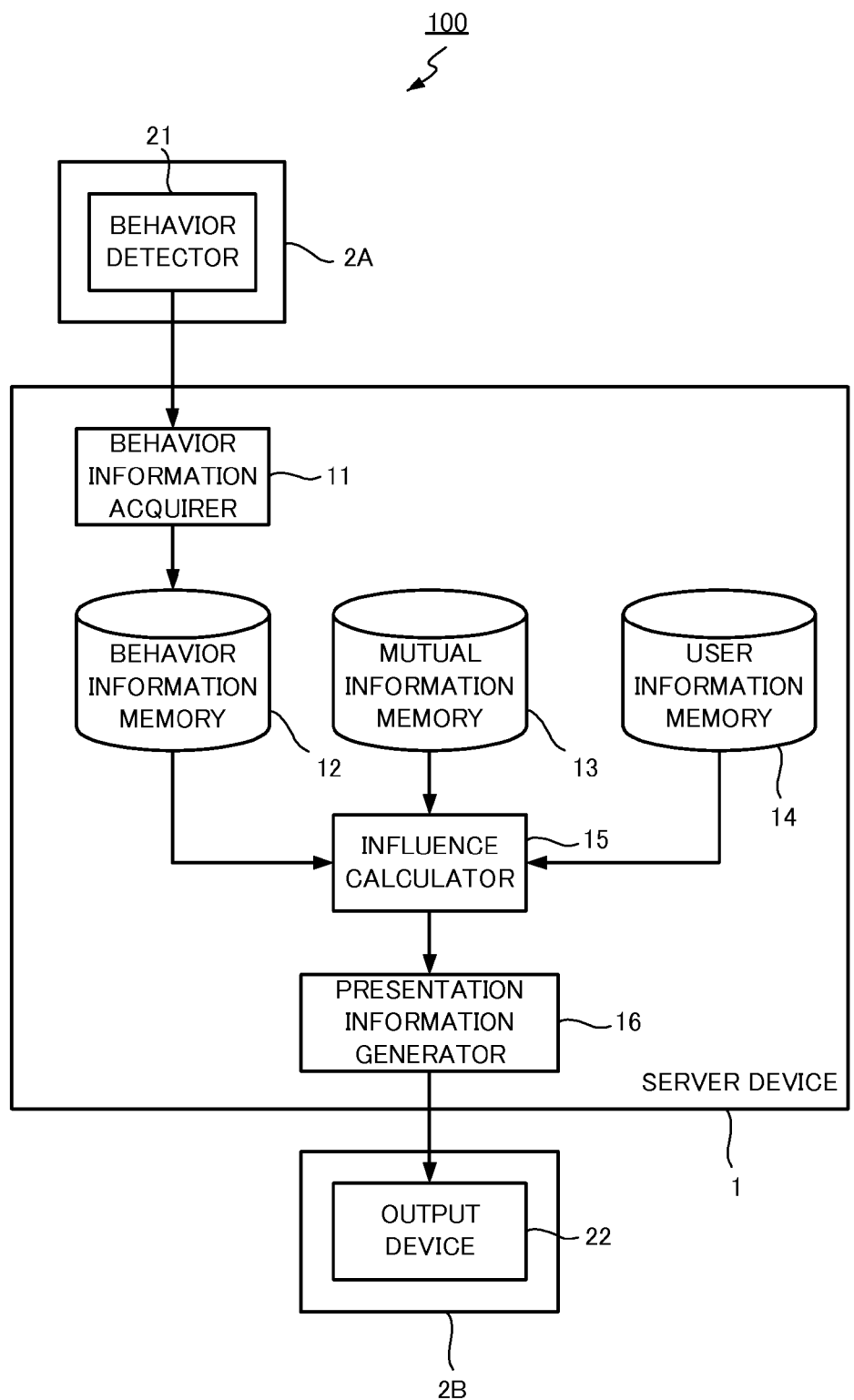
FIG. 1 is a drawing depicting an exemplary configuration of a behavior promotion and suppression system according to Mode of Embodiment 1 of the present invention.

In the present invention, a similar behavior carried out by another user who has a connection with a user and has seen a behavior of the user or the result thereof is hereafter referred to as influenced behavior. Furthermore, in addition to an action of a user such as "walk" and "buy", a state of a user such as "standing" and "sitting" is also treated as a "behavior".

Modes for carrying out the present invention will hereafter be described in detail with reference to the drawings. It should be noted that the same reference numerals are appended to the same or corresponding portions in the drawings.

Mode of Embodiment 1

FIG. 1 is a drawing depicting an exemplary configuration of a behavior promotion and suppression system according to Mode of Embodiment 1 of the present invention. A behavior promotion and suppression system 100 comprises a server device 1, a terminal device 2A, and a terminal device 2B. The server device 1 and the terminal devices 2A and 2B communicate with each other by way of a communication network not depicted in the drawing. The server device 1 is provided with a behavior information acquirer 11, a behavior information memory 12, a mutual information memory 13, a user information memory 14, an influence calculator 15, and a presentation information generator 16. The terminal device 2A is provided with a behavior detector 21, and the terminal device 2B is provided with an output device 22. With respect to the terminal device 2A and/or the terminal device 2B, it is permissible for each user to hold the terminal device 2A and/or the terminal device 2B, and it is permissible for the terminal device 2A and/or the terminal device 2B to be provided in a predetermined place or in the vicinity thereof. Furthermore, it is permissible for the terminal device 2A and the terminal device 2B to be a single terminal provided with the behavior detector 21 and the output device 22.

First, the behavior detector 21 of the terminal device 2A detects a behavior of a user and converts the behavior into data, associates the data with identification information that identifies the user and the date and time at which the behavior of the user was detected, and transmits the data and the associated information to the server device 1 as behavior information.

The behavior detector 21 detects the behavior of the user as follows, for example. The behavior detector 21 senses that the user has entered a predetermined area by detecting an RF tag held by the user, by means of a tag reader installed in a predetermined place, or by detecting the location by means of a GPS receiver of an electronic device held by the user. If the user has entered the predetermined area, image data for which the user or the predetermined place is captured by means of a camera installed in the predetermined area is generated. Information indicating the movement of the user is generated using an acceleration sensor provided in the electronic device held by the user or an acceleration sensor installed in the predetermined place. The behavior detector 21 detects a behavior of the user by a combination of these methods.

For example, the behavior detector 21 detects that the user is in front of a money donation box by means of the RF tag reader, and the user standing in front of the money donation box and donating money or passing by is extracted from image data captured by a camera installed so as to capture an image of the front of the money donation box. The mode of implementation of the terminal device 2A and the terminal device 2B is also altered depending on which method is employed to detect the behavior of the user. The terminal device 2A and the terminal device 2B can be, for example, a mobile telephone, a display provided in the predetermined area, a camera and microphone, or a tag reader.

The behavior information acquirer 11 of the server device 1 receives the behavior information transmitted from the behavior detector 21 of the terminal device 2A, and stores the behavior information in the behavior information memory 12. It is permissible for the behavior detector 21 to transmit, to the behavior information acquirer 11, raw data such as identification information that identifies the user, or image data for which the user or the predetermined place has been captured. In this case, the behavior information acquirer 11 detects a behavior of the user from this raw data and converts the behavior into data, generates behavior information by associating the data with identification information that identifies the user and the date and time at which the behavior of the user was detected, and stores the behavior information in the behavior information memory 12.

FIG. 2 is a drawing depicting an example of behavior information stored in a behavior information memory according to Mode of Embodiment 1. The behavior information includes at least information representing the behavior carried out by the user and information identifying the user. In the example of FIG. 2, the behavior information comprises the items of a "data ID" identifying the behavior information, a "user ID" identifying the user who carried out the behavior, a "date and time" indicating the date and time at which the behavior of the user was detected, a "place" indicating the place at which the behavior of the user was detected, and a "behavior" indicating the user behavior detected. Other than these items, it is permissible for the behavior detector 21 of the terminal device 2A or the behavior information acquirer 11 of the server device 1 to extract a number of the subjects for the behaviors of the user from image data for which the user or predetermined place is captured, and to associate the extracted number with the behavior information generated. For example, if behavior information indicating that the user has bought a canned drink is generated, the number of canned drinks bought by the user is associated with the behavior information.

Furthermore, the behavior information memory 12 stores a behavior list indicating combinations of a behavior of the user and a subsequent possible behavior of the user.

FIG. 3 is a drawing depicting an example of a behavior list stored in a behavior information memory according to Mode of Embodiment 1. The behavior information memory 12 stores, in advance, combinations of behaviors of the user and subsequent possible behaviors of the user as a behavior list. For example, with respect to the behavior of "buy a canned drink", the subsequent possible behaviors of the user are thought to be "separate and throw away the empty can", "throw away the empty can into a garbage bin", and "carelessly throw away the empty can". In this case, the combination of "buy a canned drink" and "separate and throw away the empty can", the combination of "buy a canned drink" and "throw away the empty can into a garbage bin", and the combination of "buy a canned drink" and "carelessly throw away the empty can" are stored in the behavior list.

It should be noted that, in addition to the action of buying a canned drink, the state of "be in front of a money donation box" is also treated as a "behavior" in the present invention. With respect to information indicating the behavior of "be in front of a money donation box", the subsequent possible behaviors of the user are thought to be "donate money" and "pass by". In this case, the combination of "be in front of a money donation box" and "donate money", and the combination of "be in front of a money donation box" and "pass by" are stored in the behavior list.

In addition, the category of the subsequent possible behavior of the user is associated and stored in the behavior list of FIG. 3. For example, the "environmental activity" category is associated with the behavior of "separate and throw away the empty can", the "ordinary behavior" category is associated with the behavior of "throw away the empty can into a garbage bin", and the "deviant behavior" category is associated with the behavior of "carelessly throw away the empty can". Furthermore, the "social contribution" category is associated with the behavior of "donate money". The categories include a category for selfless behavior such as environmental activity and social contribution, a category for selfish behavior such as deviant behavior, and a category for neutral behavior that is neither selfless nor selfish such as ordinary behavior. Here, the four categories of "environmental activity", "ordinary behavior", "deviant behavior", and "social contribution" have been given as examples, but it is also permissible to use other categories such as "health activity" and "dangerous act", for example.

The mutual information memory 13 of FIG. 1 stores mutual information representing connections between users.

Figure 4:
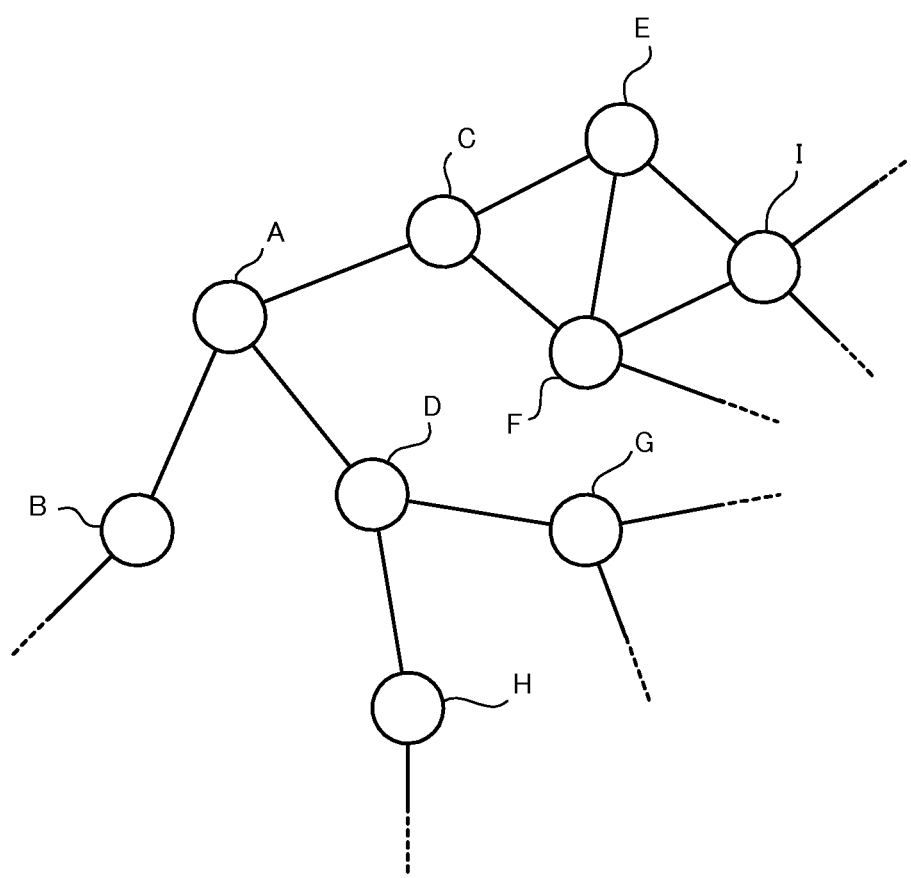
FIG. 4 is a conceptual diagram depicting mutual information stored in a mutual information memory according to Mode of Embodiment 1.

FIG. 4 is a conceptual diagram depicting mutual information stored in a mutual information memory according to Mode of Embodiment 1. The mutual information is information representing connections between a plurality of users and, for example, is expressed in the form of a network in which a person is represented as a node and the connections between people are represented as links. In the example of FIG. 4, if attention is focused on user A, user B, user C, and user D, it is seen that user A has a connection with user B, user C, and user D. User B has a connection with user A but does not have a connection with user C or user D. User C has a connection with user A but does not have a connection with user B or user D. User D has a connection with user A but does not have a connection with user B or user C.

The user information memory 14 of FIG. 1 stores user information representing the influence of the behaviors of users. The user information is information indicating weightings as to the degree of influence a user has on other users over the network, as depicted in FIG. 4.

FIG. 5 is a drawing depicting an example of user information stored in a user information memory according to Mode of Embodiment 1. The user information is information representing the influence of the behaviors of the users, and specifies the degree of influence of the users. The user information depicted in FIG. 5 specifies the degree of influence for each category from user 1 to user 2 for each set {user 1, user 2} of two connected users selected from the plurality of users. The same categories as the categories in the behavior list are used for the categories here. Furthermore, the time from user 1 carrying out a certain behavior to user 2 carrying out an influenced behavior is associated as an implementation time. It should be noted that it is permissible for the implementation time to be predefined or input by a user, and, as mentioned hereafter in Mode of Embodiment 4, it is permissible for the implementation time to be the average time from the behavior of user 1 to the influenced behavior of user 2 from when user 2 has carried out influenced behaviors in the past.

The degree of influence is the probability of user 2, who has a connection with user 1, carrying out an influenced behavior having seen a behavior carried out by user 1 or the result thereof. It is permissible for this probability to be predefined or input by a user, and, as mentioned hereafter in Mode of Embodiment 4, it is permissible for this probability to be calculated from past behavior information stored in the behavior information memory 12.

Factors for the degree of influence other than the category of behavior include the combination of the genders of user 1/user 2 (for example, female/female, female/male, male/female, male/male, same gender, different gender, and so on), the combination of ages (for example the combination of age groups such as 20s/30s, and older/younger, and so on), and the combination of place of work and occupations (for example doctor/nurse, order-receiving side/order-placing side, and so on), and the degree of connection (for example, the type and number of communities to which both users belong). It is possible for the degree of influence to be defined for each of these factors. Furthermore, it is permissible for the degree of influence to be defined for each combination of these pluralities of factors. A community is, for example, a mailing list, a work group, a project group, a social activity group, a school class, a club activity, a cultural activity (culture center) group, and a neighborhood association group, and so on.

In FIG. 5, for example, the degree of influence from user A to user B for a behavior classified under environmental activity is 0.5. The implementation time to user B carrying out an influenced behavior after user A has carried out a behavior classified under environmental activity is 0.5 days.

If this kind of mutual information and user information is employed, it is possible to predict the influence of a behavior classified under a certain category, in terms of from which user to which user, at what probability, and for what length of time the influence will propagate.

On the basis of the mutual information, the user information, and the behavior list respectively stored in the mutual information memory 13, the user information memory 14, and the behavior information memory 12, the influence calculator 15 of FIG. 1 calculates the influence a subsequent possible behavior carried out by a user has on another user, the influence including a percentage at which it is inferred that the another user, who has a connection with the user and has seen the behavior in question or the result thereof in the case the user has carried out a subsequent possible user behavior of the user behavior indicated by the behavior information acquired by the behavior information acquirer 11, carries out an influenced behavior. The influence calculator 15, for example, calculates how the influence of the behavior in question will propagate over the network of mutual information.

The presentation information generator 16 of FIG. 1 generates presentation information including the percentage at which it is inferred that the another user, who has seen the behavior in question or the result thereof in the case the user has carried out a possible behavior, carries out an influenced behavior. The presentation information generator 16, for example, generates presentation information depicting the way in which the influence of a subsequent possible user behavior of a user behavior indicated by behavior information acquired by the behavior information acquirer 11 propagates to other users, and transmits the presentation information to the terminal device 2B. It should be noted that it is permissible for the server 1 to be provided with an output device, and for the output device to output the presentation information generated by the presentation information generator 16. The output device 22 of the terminal device 2B of FIG. 1 outputs the presentation information received from the presentation information generator 16 and presents the presentation information to the user.

It should be noted that, as mentioned hereafter in Mode of Embodiment 4, it is permissible for the user information memory 14 to associate the most common behavior category from among the categories of the user behavior to be promoted or suppressed by means of the presentation information, with the information identifying the user, and to be stored as effect information.

Figure 6:
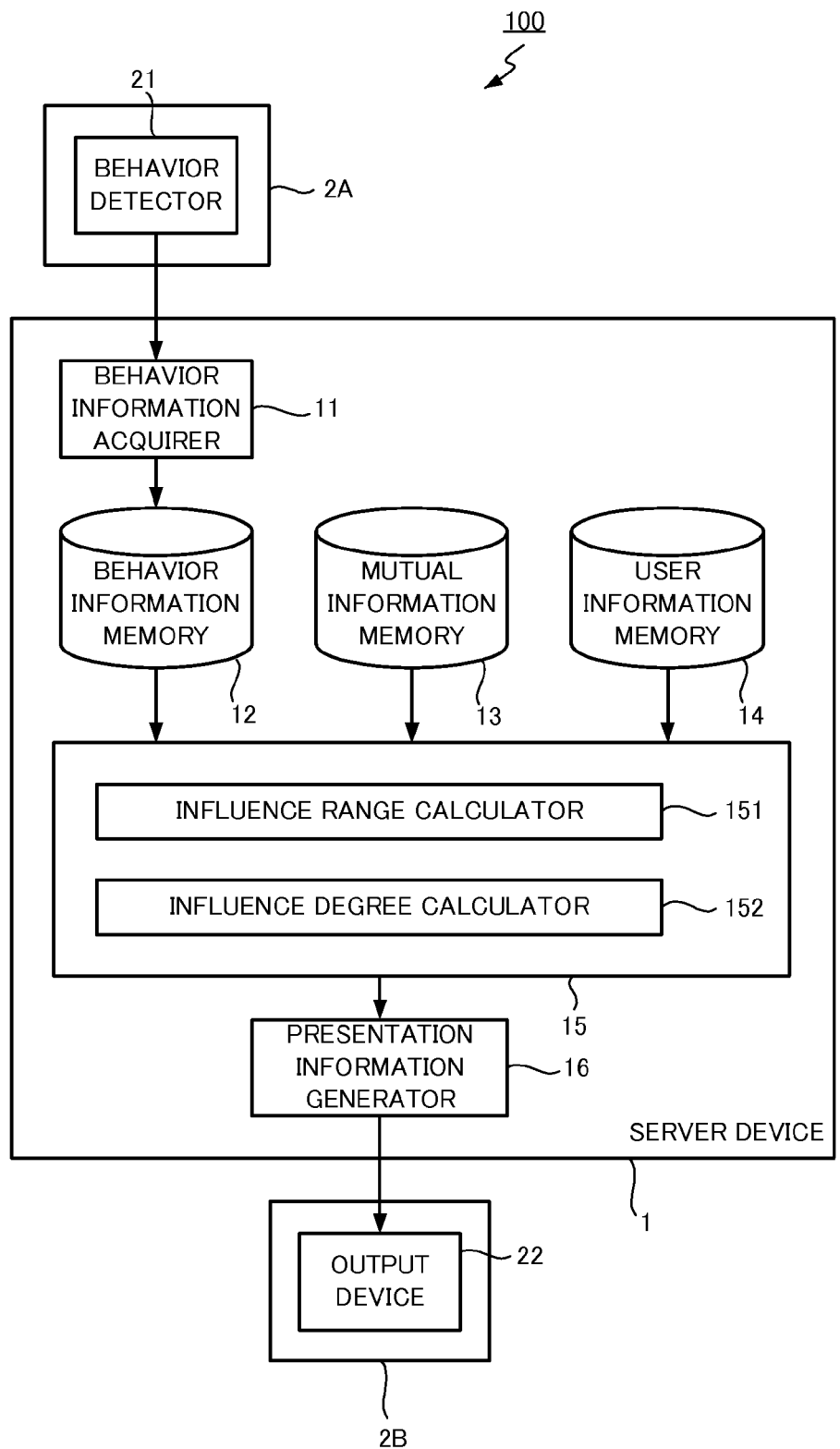
FIG. 6 is a drawing depicting the details of an influence calculator according to Mode of Embodiment 1.

FIG. 6 is a drawing depicting the details of an influence calculator according to Mode of Embodiment 1. The influence calculator 15 is provided with an influence range calculator 151 and an influence degree calculator 152. When the behavior information acquirer 11 acquires behavior information, the behavior information is stored in the behavior information memory 12. The influence range calculator 151 of the influence calculator 15 acquires, from the behavior list stored by the behavior information memory 12, a list of subsequent possible user behaviors of a behavior indicated by the behavior information stored in the behavior information memory 12. The influence range calculator 151, with regard to each of the subsequent possible user behaviors acquired from the behavior list, uses the mutual information indicating connections between users that is stored by the mutual information memory 13, and the user information indicating the degree of influence between the users that is stored by the user information memory 14, to calculate the range (hereafter referred to as the range of influence) of the users inferred to carry out an influenced behavior having seen the behavior in question or the result thereof in the case the user has carried out a subsequent possible behavior.

The influence degree calculator 152 uses the user information to calculate a degree of influence for each user within the range of influence, for the cases in which the user has carried out each of the subsequent possible behaviors. The influence range calculator 151 and the influence degree calculator 152 carry out these calculations for each preset period of one day after, one week after, and one month after the user has carried out each of the behaviors.

The presentation information generator 16, on the basis of the range of influence calculated by the influence range calculator 151 and the degree of influence calculated by the influence degree calculator 152, generates presentation information which indicates the way how influence propagates one day after, one week after, and one month after the user has carried out each of the behaviors, and which is for promoting or suppressing the behavior in question, and the presentation information generator 16 transmits the presentation information to the terminal device 2B. It is permissible for the presentation information to be viewable information including a video or image, or to be audio.

It should be noted that, if it is desirable for a behavior classified under a specific category to be promoted or suppressed, it is permissible for the range of influence and degree of influence to be calculated by the influence range calculator 151 and the influence degree calculator 152 with respect to only the behavior classified under the category in question from among the subsequent possible user behaviors, and for the presentation information generator 16 to generate presentation information. For example, it is permissible for reference to be made to the effect information stored by the user information memory 14, and the range of influence and degree of influence to be calculated by the influence range calculator 151 and the influence degree calculator 152 with respect to only the behavior classified under the category having the greatest promoting or suppressing effect for the user, and for the presentation information generator 16 to generate presentation information. As a result of this, it is possible for the processing speed to be reduced, and for the presentation information to be presented to the user in a prompt manner.

Figure 7:
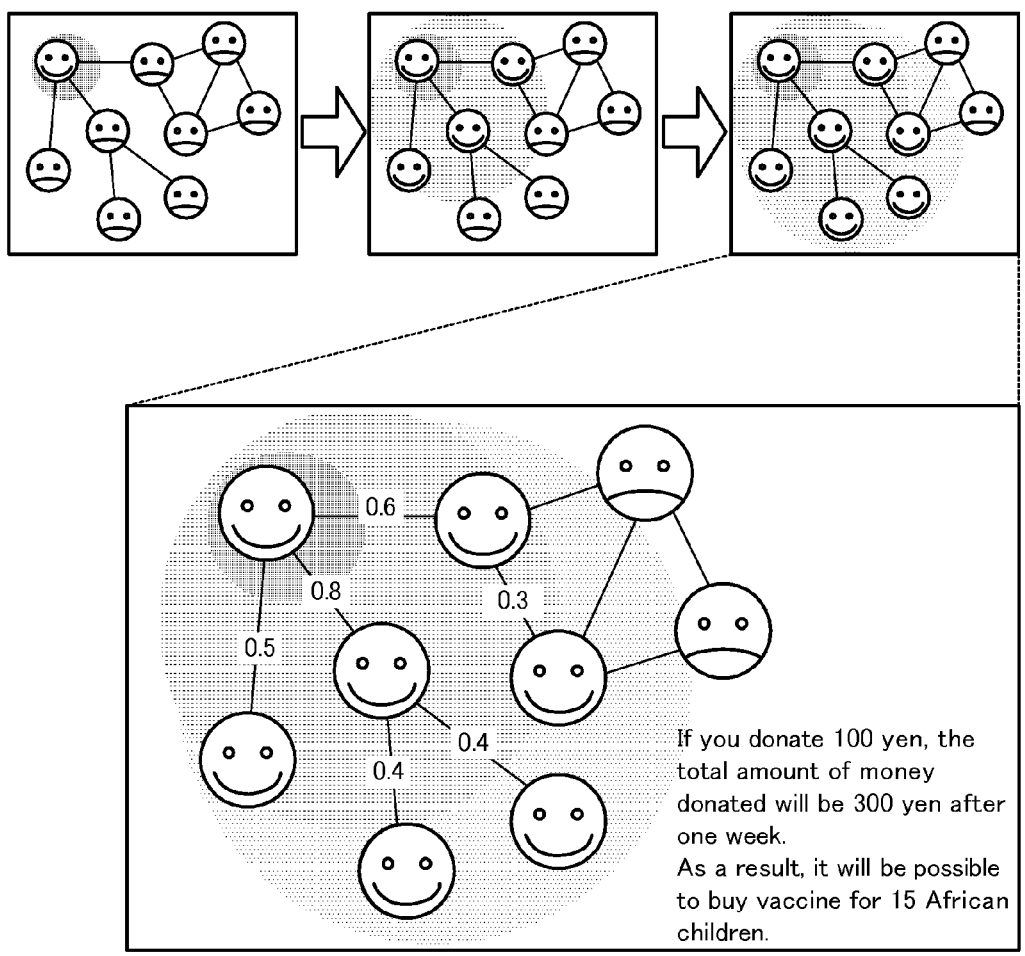
FIG. 7 is a drawing depicting an example of presentation information that promotes the behavior of a user and is generated by a presentation information generator according to Mode of Embodiment 1.

FIG. 7 is a drawing depicting an example of presentation information generated by a presentation information generator according to Mode of Embodiment 1. The presentation information of FIG. 7 is an example of presentation information for promoting selfless behavior classified under the category of environmental activity or social contribution. First, when the behavior information acquirer 11 acquires behavior information indicating that user A is standing in front of a money donation box, the behavior information is stored in the behavior information memory 12. The influence range calculator 151 of the influence calculator 15 acquires, from the behavior list (see FIG. 3) stored in the behavior information memory 12, a list of subsequent possible behaviors of the behavior of "standing in front of a money donation box" indicated by the behavior information stored in the behavior information memory 12. The influence range calculator 151 acquires "donate money" (social contribution) and "pass by" (ordinary behavior).

Here, in order to present, to the user, presentation information promoting a selfless behavior, the influence range calculator 151 refers to the mutual information depicted in FIG. 4 and the user information depicted in FIG. 5 with regard to "donate money" (social contribution) from among "donate money" (social contribution) and "pass by" (ordinary behavior), and calculates the range of influence in the case user A has donated money. Furthermore, presentation information depicting the way in which the influence of the behavior of user A at one day after and one week after user A donates money propagates is generated.

First, the influence range calculator 151 calculates the range of influence at one day after user A has donated money. The influence range calculator 151 refers to the mutual information depicted in FIG. 4, and finds that the users having a connection with the user A are user B, user C, and user D. The influence range calculator 151 refers to the user information depicted in FIG. 5, and finds that, for a behavior classified under the social contribution category, the degrees of influence from user A to user B, user C, and user D are respectively 0.5, 0.6, and 0.8, and that the implementation times are respectively one day, 0.5 days, and one day. The influence range calculator 151 determines that, after one day from user A carrying out the behavior classified under the social contribution category, there is an influence from user A to user B, user C, and user D from the behavior classified under the social contribution category.

According to the implementation time, it takes one day from user A carrying out "donate money" (social contribution) to user B and user D carrying out an influenced behavior, and therefore the influence range calculator 151 determines that the influence from user A reaches up to user B and user D after one day from user A donating money. Therefore, the influence range calculator 151 refers to the mutual information depicted in FIG. 4, and specifies users (user E and user F) other than user A that have a connection with user C. The influence range calculator 151 refers to the degree of influence between user C and users E and F of a behavior under the social contribution category and the implementation time therefor from the user information, and determines whether or not there is influence from a behavior classified under the social contribution category 0.5 days after user C donates money.

It is determined that there is no influence from a behavior classified under the social contribution category from user C to user E and user F after 0.5 days. Namely, it takes one or more days from user A carrying out "donate money" (social contribution) to user C carrying out an influenced behavior and also user E and user F carrying out an influenced behavior. Based on the above, the influence range calculator 151 determines that the influence of the behavior of user A comes to an end at user B, user C, and user D one day after user A donates money. Similarly, the influence range calculator 151 calculates the influence range at one week after user A has donated money. As a result thereof, the influence range calculator 151 calculates that the behavior of user A has an influence on the three people of user B, user C, and user D one day after user A donates money, and has an influence on the six people of user B, user C, user D, user F, user G, and user H one week after user A donates money.

Next, the influence degree calculator 152 refers to the user information of FIG. 4, and calculates the degree of influence of the behavior of user A with respect to each user within the range of influence at one week after user A carries out "donate money" (social contribution). The degrees of influence from user A to user B, user C, and user D for a behavior classified under social contribution are 0.5, 0.6, and 0.8, respectively. If the degree of influence from user C to user E for a behavior classified under social contribution is 0.5, the degree of influence from user A to user E for a behavior classified under social contribution is calculated by means of the calculation formula of 0.6×0.5=0.3. Similarly, if the degrees of influence from user D to users G and H for a behavior classified under social contribution are each 0.5, the degrees of influence from user A to users G and H for a behavior classified under social contribution are calculated by means of the calculation formula of 0.8×0.5=0.4.

When the influence degree calculator 152 calculates the degrees of influence from user A to the users within the range of influence at one week after user A donates money, the amount of money assumed to be donated by user A is multiplied by the degree of influence, and the amount of money thus obtained is calculated as the expected value for the amount of money donated by each user, and the total of the expected values for the amounts of money donated by all users within the range of influence at one week after is calculated. If the amount of money assumed to be donated by user A is 100 yen, the influence degree calculator 152 calculates the total of the expected values for the amounts of money donated at one week after by means of the calculation formula of 100×(0.5+0.6+0.8+0.4+0.4+0.3)=300 yen.

The presentation information generator 16 stores, in advance, information required to generate presentation information. For example, the presentation information generator 16 stores the information that "the price per person of a vaccine for saving an African child is 20 yen" with respect to the behavior of "donate money" (social contribution). The presentation information generator 16 calculates how many children are capable of being supplied with vaccine with the 300 yen total for the expected values for the amounts of money donated at one week after user A donates money, and a message stating that "If you donate 100 yen, the total amount of money donated will be 300 yen after one week. As a result, it will be possible to buy vaccine for 15 African children.", indicating the consequent result of the behavior of user A.

The presentation information generator 16 generates presentation information such as that depicted in FIG. 7, comprising the range of influence calculated by the influence range calculator 151, the degree of influence calculated by the influence degree calculator 152, and the message generated by the presentation information generator 16 indicating the consequent result of the behavior of user A.

It should be noted that it is permissible for the presentation information to comprise any of the "range of influence", "degree of influence", and "message indicating the consequent result of the behavior", or a combination of these. It is permissible for the total amount of money donated to simply be (the amount assumed to be donated by user A)×(the number of all of the users within the range of influence). Furthermore, for example, it is permissible for audio stating that "A total of four people will have donated money after one day, and a total of seven people will have donated money after one week. The total amount of money donated after one week will be 300 yen. As a result, it will be possible to buy vaccine for 15 African children." to be output.

User A who sees or hears this kind of presentation information is able to know that his or her selfless behavior induces selfless behavior of other users, and it is possible to expect that the selfless behavior of user A will be promoted. Furthermore, further selfless behavior is promoted by specifically presenting the good effect of "it will be possible to buy vaccine for 15 African children" that it is possible to expect from the selfless behavior of user A.

Figure 8:
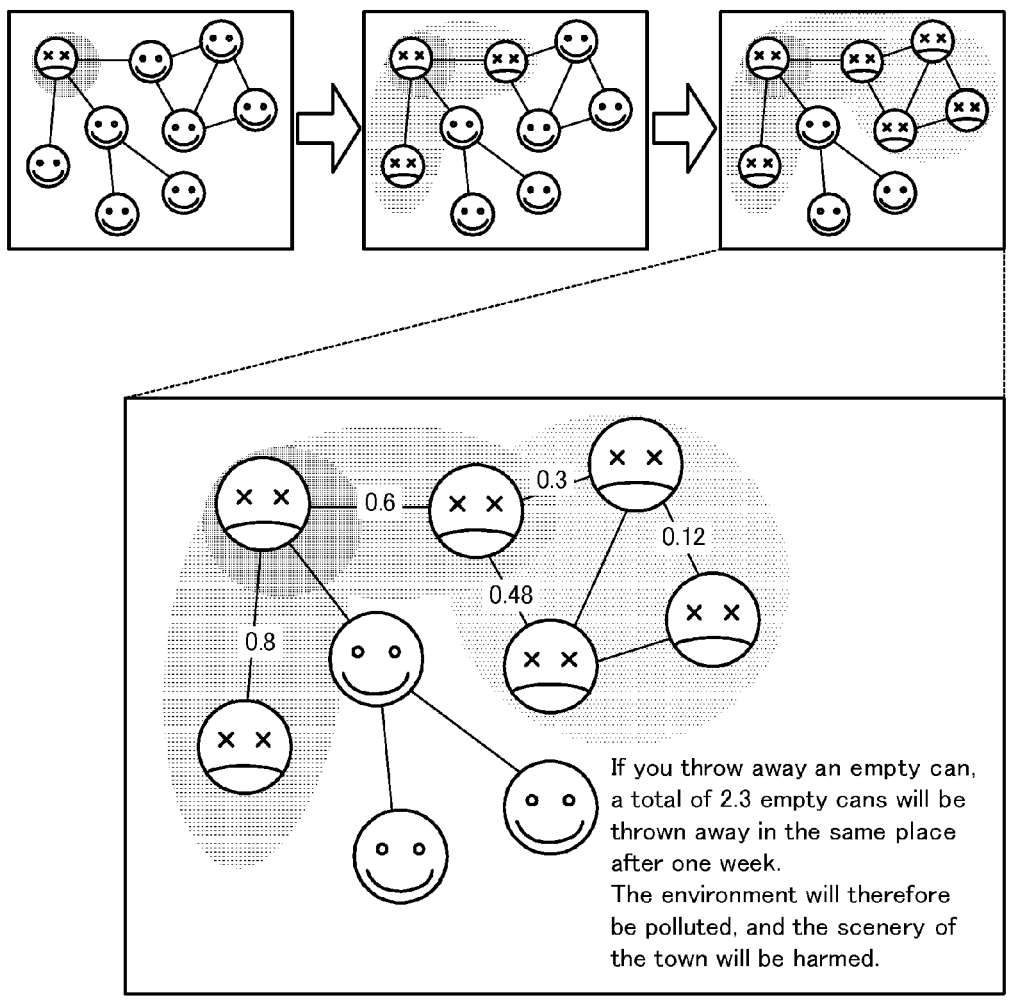
FIG. 8 is a drawing depicting an example of presentation information that suppresses the behavior of a user and is generated by a presentation information generator according to Mode of Embodiment 1.

FIG. 8 is a drawing depicting an example of presentation information that suppresses the behavior of a user and is generated by a presentation information generator according to Mode of Embodiment 1. The presentation information of FIG. 8 is an example of presentation information for suppressing a selfish behavior classified under a category such as deviant behavior. First, when the behavior information acquirer 11 acquires behavior information indicating that user A has bought a canned drink, this behavior information is stored in the behavior information memory 12. The influence range calculator 151 of the influence calculator 15 acquires, from the behavior list (see FIG. 3) stored in the behavior information memory 12, a list of subsequent possible behaviors of the behavior of "buy a canned drink" indicated by the behavior information stored in the behavior information memory 12. The influence range calculator 151 acquires "separate and throw away the empty can" (environmental activity), "throw away the empty can into a garbage bin" (ordinary behavior), and "carelessly throw away the empty can" (deviant behavior).

Here, in order to present, to the user, presentation information suppressing a selfish behavior, the influence range calculator 151 of the influence calculator 15 refers to the mutual information depicted in FIG. 4 and the user information depicted in FIG. 5 with regard to "carelessly throw away the empty can" (deviant behavior) from among "separate and throw away the empty can" (environmental activity), "throw away the empty can into a garbage bin" (ordinary behavior), and "carelessly throw away the empty can" (deviant behavior), and calculates the range of influence in the case user A carelessly throws away the empty can. Furthermore, presentation information indicating the way in which the influence of the behavior of user A at one day after and one week after user A carelessly throws away the empty can propagates is generated.

First, the influence range calculator 151 calculates the range of influence at one day after user A has carelessly thrown away the empty can. The influence range calculator 151 refers to the mutual information depicted in FIG. 4, and finds that the users having a connection with the user A are user B, user C, and user D. The influence range calculator 151 refers to the user information depicted in FIG. 5, and finds that, for a behavior classified under the deviant behavior category, the degrees of influence from user A to user B, user C, and user D are respectively 0.8, 0.6, and 0.0, and that the implementation times thereof are respectively one day, one day, and zero days. The influence range calculator 151 determines that, after one day from user A carrying out a behavior classified under the deviant behavior category, there is an influence from user A to user B and user C from the behavior classified under the deviant behavior category.

Here, according to the implementation time, it takes one day from user A carrying out "carelessly throw away the empty can" (deviant behavior) to user B and user C carrying out an influenced behavior, and therefore the influence range calculator 151 determines that the influence from user A to user B and from user A to user C comes to an end after one day from user A carelessly throwing away the empty can. Similarly, the influence range calculator 151 calculates the range of influence at one week after user A has carelessly thrown away the empty can. As a result thereof, the influence range calculator 151 calculates that there is an influence on the two people of user B and user C one day after user A carelessly throws away the empty can, and there is an influence on the five people of user B, user C, user E, user F, and user I one week after user A carelessly throws away the empty can.

Next, the influence degree calculator 152 refers to the user information of FIG. 4, and calculates the degree of influence with respect to each user within the range of influence at one week after user A carries out "carelessly throw away the empty can" (deviant behavior). The degrees of influence of a behavior classified under deviant behavior from user A to user B and user C are 0.8 and 0.6, respectively. If the degree of influence from user C to user E for a behavior classified under deviant behavior is 0.5, the degree of influence from user A to user E for a behavior classified under deviant behavior is calculated by means of the calculation formula of 0.6×0.5=0.3. Similarly, if the degree of influence from user C to user F for a behavior classified under deviant behavior is 0.8, the degree of influence from user A to user F for a behavior classified under deviant behavior is calculated by means of the calculation formula of 0.6×0.8=0.48. Furthermore, if the degree of influence from user E to user I for a behavior classified under deviant behavior is 0.4, the degree of influence from user A to user I for a behavior classified under deviant behavior is calculated by means of the calculation formula of 0.6×0.5×0.4=0.12.

When the influence degree calculator 152 calculates the degrees of influence from user A to the users within the range of influence at one week after user A has carelessly thrown away an empty can, the number of empty cans assumed to be carelessly thrown away by user A is multiplied by the degrees of influence, and the numbers thus obtained are calculated as the expected values for the number of empty cans carelessly thrown away by each user, and the total of the expected values for the numbers of empty cans carelessly thrown away by all users within the range of influence at one week after user A has carelessly thrown away the empty can is calculated. If the number of empty cans assumed to be carelessly thrown away by user A is one can, the influence degree calculator 152 calculates the total of the expected values for the numbers of empty cans carelessly thrown away at one week after user A has carelessly thrown away the empty can by means of the calculation formula of 1×(0.8+0.6+0.3+0.48+0.12)=2.3.

The presentation information generator 16 stores, in advance, information required to generate presentation information. For example, the presentation information generator 16 stores the information that "the environment is polluted, and the scenery of the town is harmed" with respect to the behavior of "carelessly throw away an empty can" (deviant behavior). The presentation information generator 16 generates a message stating that "If you throw away an empty can, a total of 2.3 empty cans will be thrown away in the same place after one week. The environment will therefore be polluted, and the scenery of the town will be harmed.", indicating the consequent result of the behavior of user A.

The presentation information generator 16 generates presentation information such as that depicted in FIG. 8, comprising the range of influence calculated by the influence range calculator 151, the degree of influence calculated by the influence degree calculator 152, and the message generated by the presentation information generator 16 indicating the consequent result of the behavior of user A.

It should be noted that it is permissible for the total number of empty cans carelessly thrown away to simply be (the number of empty cans assumed to be carelessly thrown away by user A)×(the number of all of the users within the range of influence). Furthermore, for example, it is permissible for audio stating that "A total of three people will have carelessly thrown away empty cans in the same place after one day, and a total of six people will have carelessly thrown away empty cans in the same place after one week. The total number of empty cans after one week will be 2.3. The environment will therefore be polluted, and the scenery of the town will be harmed." to be output.

User A who sees or hears this kind of presentation information is able to know that his or her selfish behavior triggers selfish behavior of other users, and it is possible to expect that the selfish behavior will be suppressed. Furthermore, by specifically presenting the bad effect caused from his or her selfish behavior in that "The environment will be polluted, and the scenery of the town will be harmed.", further selfish behavior is suppressed.

A numerical value (hereafter referred to as an assumed subject numerical value) for which a number or amount of the subjects for a subsequent possible behavior of the user is assumed, such as the amount of money assumed to be donated by the user or the number of empty cans assumed to be carelessly thrown away by the user, is stored in advance in the user information memory 14. It is permissible for the assumed subject numerical value to be determined based on the behavior information or to be determined in a uniform manner. Furthermore, as mentioned hereafter in Mode of Embodiment 4, it is permissible for the assumed subject numerical value to be the average of numerical values indicating numbers or amounts of the subjects for a behavior carried out by the user in the past. For example, it is permissible for the number of empty cans assumed to be carelessly thrown away by user A to be determined, on the basis of the behavior information, as the number of canned drinks bought by the user, to be uniformly determined as one can, or to be the average number of empty cans carelessly thrown away by user A in the past. If the number of empty cans assumed to be carelessly thrown away by user A is to be the number of canned drinks bought by the user, the behavior detector 21 of the terminal device 2A or the behavior information acquirer 11 of the server device 1 extracts the number of canned drinks bought by the user from image data for which the user or a predetermined place is captured, and associates information indicating the number of canned drinks bought by the user with generated behavior information.

Figure 9:
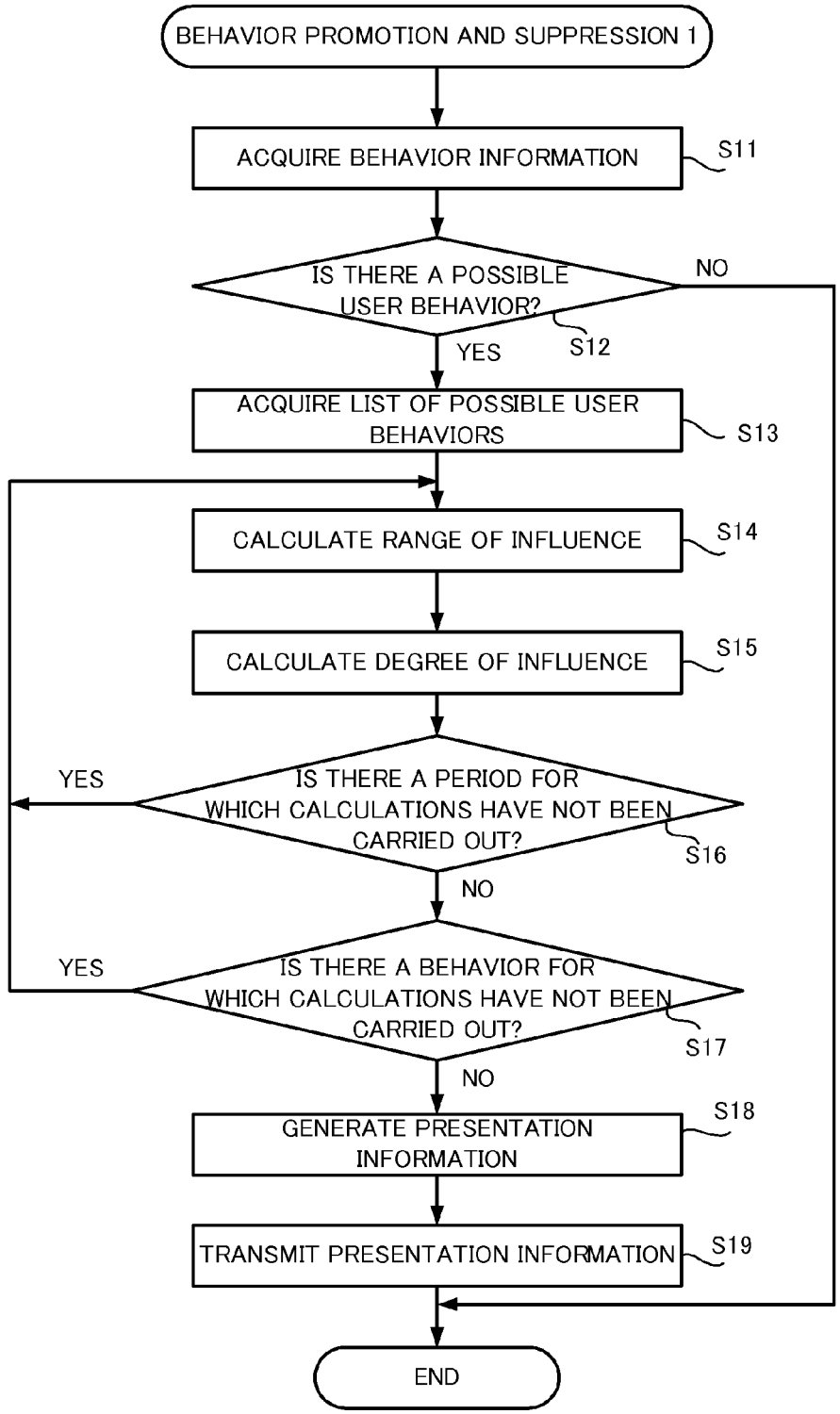
FIG. 9 is a flowchart depicting an example of a behavior promotion and suppression operation according to Mode of Embodiment 1.

FIG. 9 is a flowchart depicting an example of a behavior promotion and suppression operation according to Mode of Embodiment 1. When the behavior detector 21 of the terminal device 2A senses a user, that behavior is detected and converted into data, and the data is associated with identification information that identifies the user and the date and time at which the behavior of the user was detected, and is transmitted as behavior information to the behavior information acquirer 11 of the server device 1.

The behavior information acquirer 11 acquires behavior information from the behavior detector 21 (step S11). When the behavior information acquirer 11 acquires the behavior information, the behavior information is stored in the behavior information memory 12. The influence range calculator 151 refers to the behavior list stored by the behavior information memory 12, and determines whether or not there is a subsequent possible user behavior (step S12). If there is no subsequent possible user behavior (step S12: NO), processing is finished.

If there is a subsequent possible user behavior (step S12: YES), a list of subsequent possible user behaviors is acquired from the behavior list stored by the behavior information memory 12 (step S13). The influence range calculator 151, with regard to a subsequent possible user behavior, uses the mutual information indicating connections between users that is stored by the mutual information memory 13, and the user information indicating the degree of influence of the users that is stored by the user information memory 14, to calculate the range of influence in the case the user has carried out the subsequent possible behavior (step S14).

The influence degree calculator 152 uses the user information to calculate a degree of influence for each user within the range of influence after a predetermined period has elapsed in the case the user has carried out the behavior (step S15). The calculations of the influence range calculator 151 and the influence degree calculator 152 are carried out for each preset period of after one day, after one week, and after one month. If there is a period for which calculations have not been carried out (step S16: YES), processing returns to step S14, and step S14 to step S16 are repeated.

If there are no periods for which calculations have not been carried out (step S16: NO), it is determined whether or not there are, from among the list of subsequent possible user behaviors acquired from the behavior list, any behaviors for which the abovementioned range of influence and degree of influence calculations have not been carried out (step S17). If there is a behavior for which calculations have not been carried out (step S17: YES), processing returns to step S14, and step S14 to step S17 are repeated. If there is no behavior for which calculations have not been carried out (step S17: NO), the presentation information generator 16 generates presentation information depicting the way in which influence propagates in each preset period, for the cases in which each of the behaviors of the list of subsequent possible user behaviors has been carried out (step S18). The presentation information generator 16 transmits the generated presentation information to the terminal device 2B (step S19), and processing is finished.

As described above, according to the behavior promotion and suppression system of the present Mode of Embodiment 1, it is possible to present the way in which the influence of a future possible behavior of a user will propagate and spread, and this is effective for the promotion or suppression of the behavior of the user.

Mode of Embodiment 2

Figure 10:
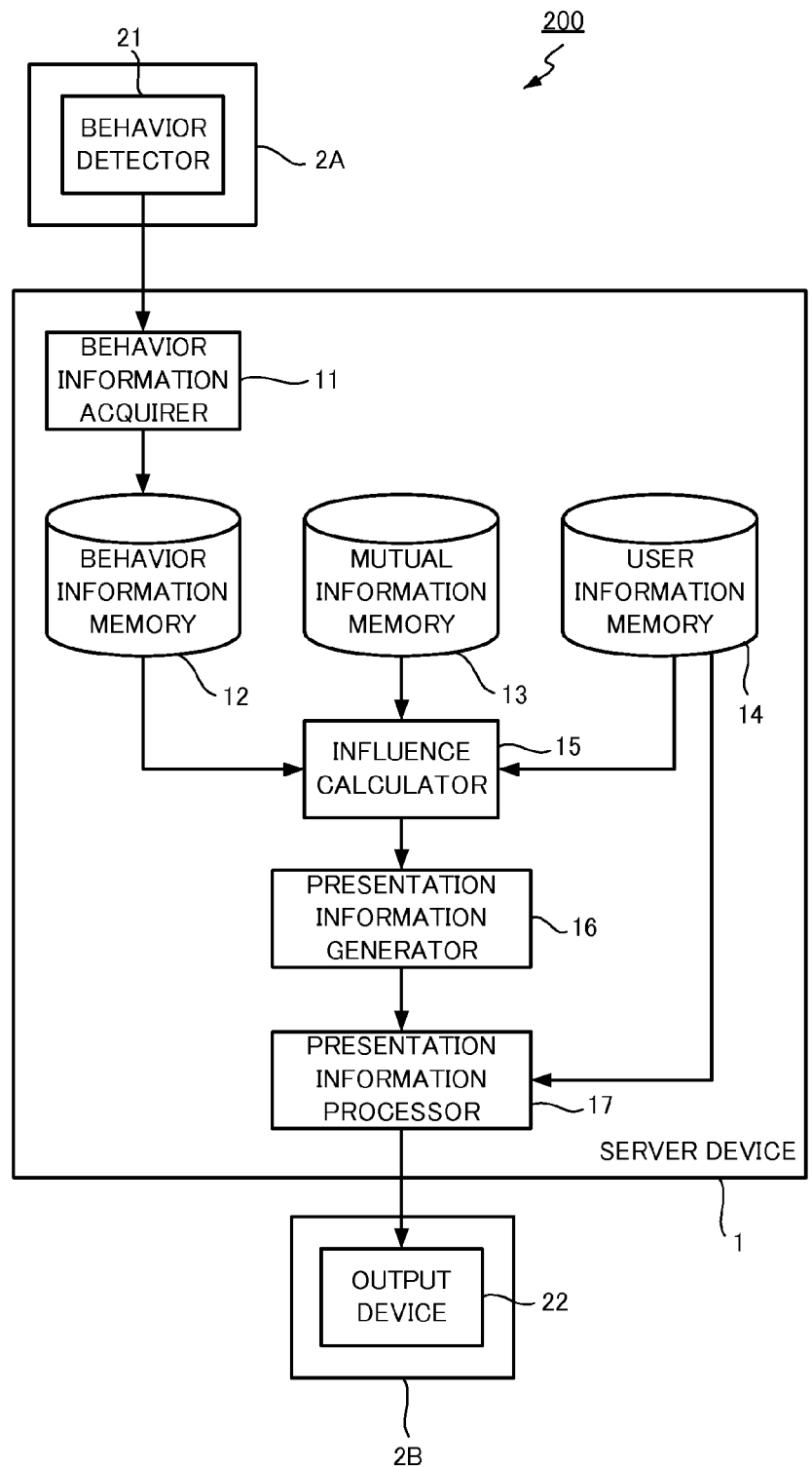
FIG. 10 is a drawing depicting an exemplary configuration of a behavior promotion and suppression system according to Mode of Embodiment 2 of the present invention.

FIG. 10 is a drawing depicting an exemplary configuration of a behavior promotion and suppression system according to Mode of Embodiment 2 of the present invention. The server device 1 of a behavior promotion and suppression system 200 is provided with a presentation information processor 17 in addition to the configuration of the server device 1 of the behavior promotion and suppression system 100. In Mode of Embodiment 2, processing is carried out in such a way that information that is of a field in which the user has an interest and is included in the presentation information presented to the user is emphasized.

The user information memory 14 of the server device 1 in Mode of Embodiment 2 stores interest information of each user in advance. The interest information is information indicating in which field of information the user has an interest. It is permissible for the interest information to be predefined or to be input by the user, and as mentioned hereafter in Mode of Embodiment 4, it is permissible for behavior information to be analyzed, for the field of the information that is included most in the presentation information, by which the behavior of the user is promoted or suppressed, to serve as the field in which the user has an interest, and for this field to be associated with information identifying the user in question and stored in the user information memory 14 as interest information. The presentation information processor 17 processes the presentation information received from the influence calculator 15, in such a way that the information of a field corresponding to the interest information of the user in question is emphasized and transmitted to the output device 22 of the terminal device 2B. It is permissible for the field of the interest information to be a field in which the user has an interest such as a field of the information making up the presentation information of the "range of influence", the "degree of influence", and the "message indicating the consequent result of the behavior", a field of an activity and social problem or region such as "volunteering", "environmental conservation", "aging society", and "Africa", and a field of a behavior such as a "selfless behavior" or "selfish behavior", and to be a field that is able to be included in the presentation information.

Figure 11:
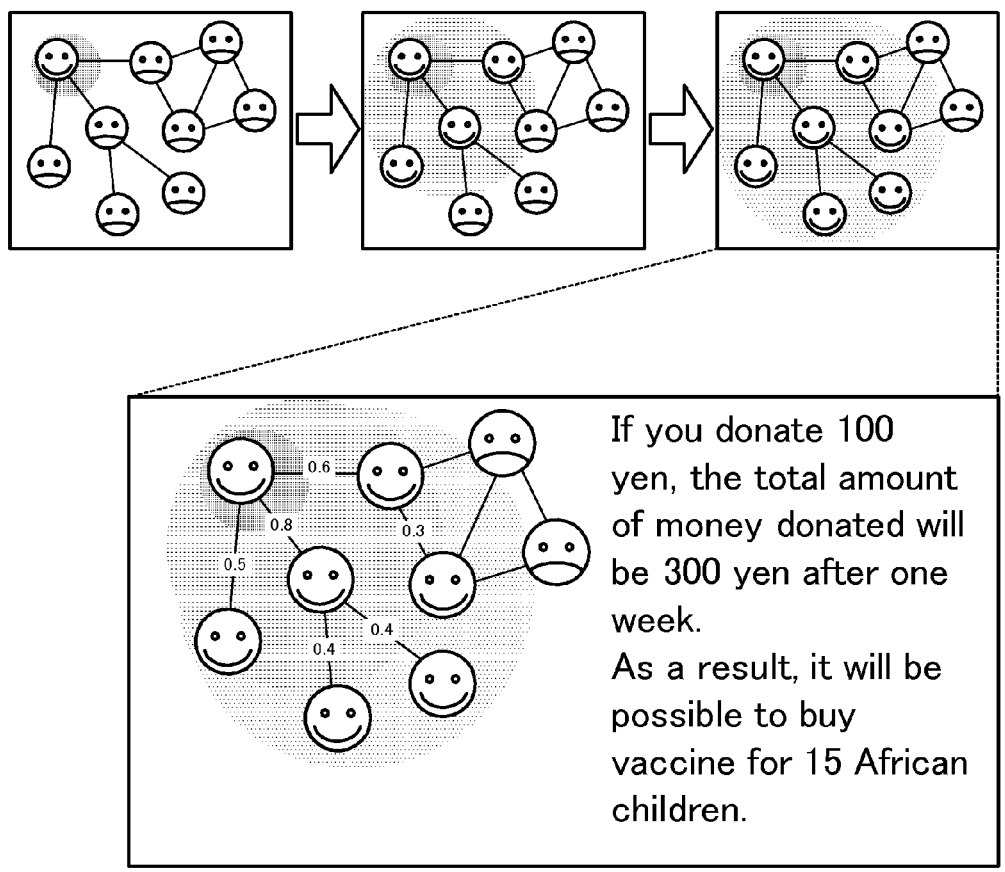
FIG. 11 is a drawing depicting an example of presentation information processed by a presentation information processor according to Mode of Embodiment 2.

FIG. 11 is a drawing depicting an example of presentation information processed by a presentation information processor according to Mode of Embodiment 2. The presentation information of FIG. 11 comprises the "range of influence", the "degree of influence", and the "message indicating the consequent result of the behavior". When the presentation information processor 17 receives the presentation information (see FIG. 7) generated by the presentation information generator 16, the user interest information to be presented is read out from the user information memory 14.

Here, if the user interest information to be presented is the "message indicating the consequent result of the behavior of the user him or herself", the presentation information processor 17 carries out processing to enlarge, from among the presentation information, the "message indicating the consequent result of the behavior of the user him or herself" stating that "If you donate 100 yen, the total amount of money donated will be 300 yen after one week. As a result, it will be possible to buy vaccine for 15 African children.". The presentation information processor 17 transmits the presentation information that has been processed in this way, to the output device 22 of the terminal device 2B. It should be noted that if the user interest information to be presented is the "degree of influence", the presentation information processor 17 carries out processing to enlarge the degree of influence from among the presentation information. Furthermore, if the user interest information to be presented is the "range of influence", the presentation information processor 17 carries out processing to enlarge the range of influence from among the presentation information.

In the example of FIG. 11, for example, if the user interest information to be presented is "Africa", it is permissible for the presentation information processor 17 to determine that this corresponds to the interest information from the character string of "Africa" being included in the "message indicating the consequent result of the behavior of the user him or herself", and to carry out processing to enlarge the "message indicating the consequent result of the behavior of the user him or herself". Alternatively, it is permissible to carry out processing to enlarge only the character string of "Africa" from within the "message indicating the consequent result of the behavior of the user him or herself". It should be noted that the method for emphasizing the information of the field corresponding to the interest information is not restricted to enlargement, and it is permissible for the color to be changed, or for movement to be applied to the characters or images. If the presentation information is audio, it is possible to use a method for modifying the audio data such as increasing the volume, increasing the pitch, or applying echo, for example.

Figure 12:
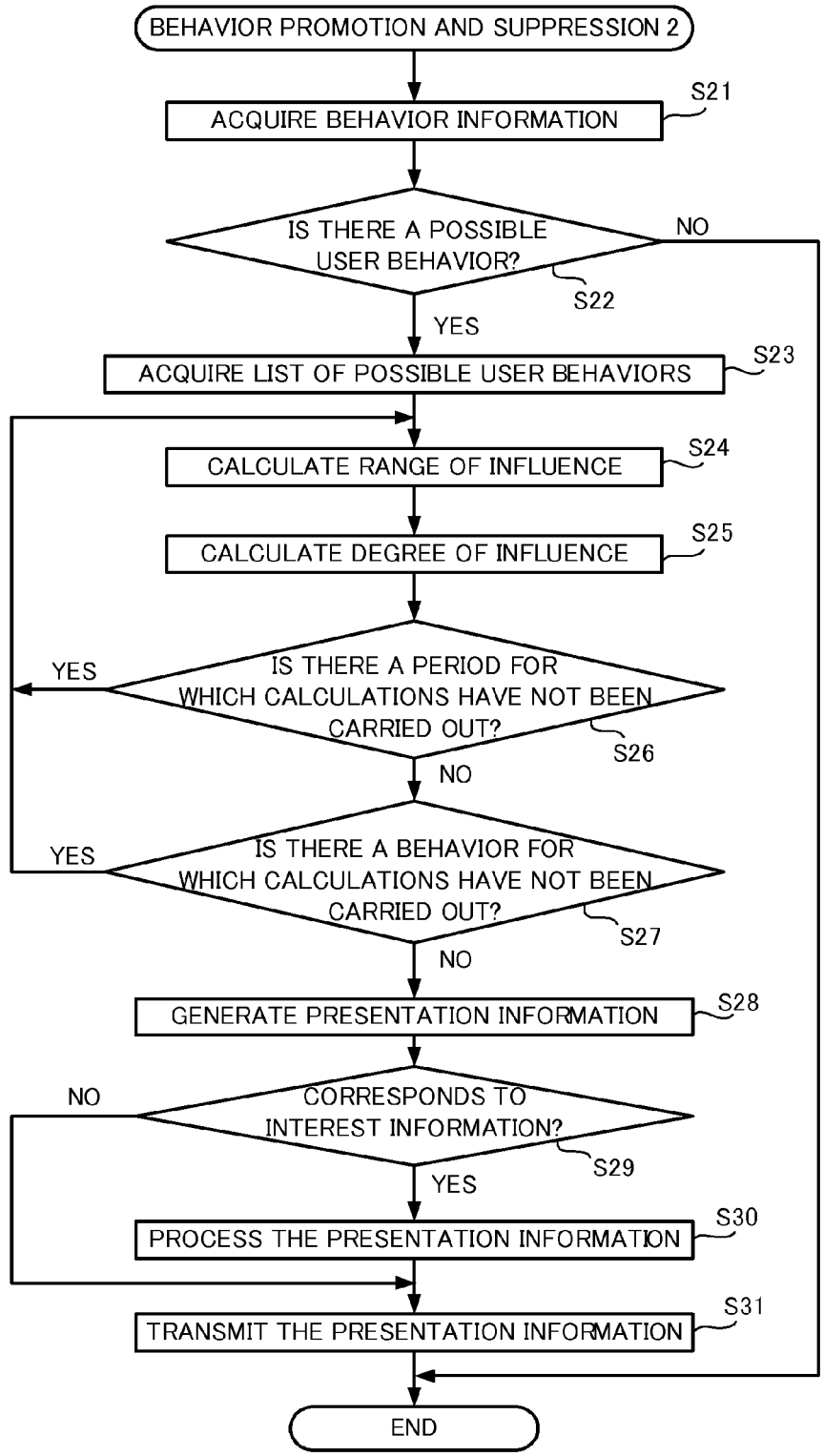
FIG. 12 is a flowchart depicting an example of a behavior promotion and suppression operation according to Mode of Embodiment 2.

FIG. 12 is a flowchart depicting an example of a behavior promotion and suppression operation according to Mode of Embodiment 2. When the behavior detector 21 of the terminal device 2A senses a user, that behavior is detected and converted into data, and the data is associated with identification information that identifies the user and the date and time at which the behavior of the user was detected, and is transmitted as behavior information to the behavior information acquirer 11 of the server device 1.

The behavior information acquirer 11 acquires the behavior information from the behavior detector 21 (step S21). When the behavior information acquirer 11 acquires the behavior information, the behavior information is stored in the behavior information memory 12. The influence range calculator 151 refers to the behavior list stored by the behavior information memory 12, and determines whether or not there is a subsequent possible user behavior (step S22). If there is no subsequent possible user behavior (step S22: NO), processing is finished.

If there is a subsequent possible user behavior (step S22: YES), a list of subsequent possible user behaviors is acquired from the behavior list stored by the behavior information memory 12 (step S23). The influence range calculator 151, with regard to a subsequent possible user behavior, uses the mutual information indicating connections between users that is stored by the mutual information memory 13, and the user information indicating the degree of influence of the users that is stored by the user information memory 14, to calculate the range of influence in the case the user has carried out the subsequent possible behavior (step S24).

The influence degree calculator 152 uses the user information to calculate a degree of influence for each user within the range of influence after a predetermined period has elapsed in the case the user has carried out the subsequent possible behavior (step S25). The calculations of the influence range calculator 151 and the influence degree calculator 152 are carried out for each preset period of after one day, after one week, and after one month. If there is a period for which calculations have not been carried out (step S26: YES), processing returns to step S24, and step S24 to step S26 are repeated.

If there are no periods for which calculations have not been carried out (step S26: NO), it is determined whether or not there are, from among the list of subsequent possible user behaviors acquired from the behavior list, any behaviors for which the calculations for the abovementioned range of influence and degree of influence have not been carried out (step S27). If there is a behavior for which calculations have not been carried out (step S27: YES), processing returns to step S24, and step S24 to step S27 are repeated. If there is no behavior for which calculations have not been carried out (step S27: NO), the presentation information generator 16 generates presentation information depicting the way in which influence propagates in each preset period, for the cases in which each of the behaviors of the list of subsequent possible user behaviors is carried out (step S28).

The presentation information processor 17 reads out the interest information of the user in question from the user information memory 14, and determines whether or not there is information of a field corresponding to the interest information, in the presentation information generated by the presentation information generator 16 (step S29). If there is no information of a field corresponding to the interest information (step S29: NO), the presentation information processor 17 transmits the presentation information to the terminal device 2B, the terminal device 2B outputs the presentation information (step S31), and processing is finished. If there is information of a field corresponding to the interest information (step S29: YES), processing is carried out with respect to the presentation information to emphasize the information of the field corresponding to the interest information (step S30). The presentation information processor 17 transmits the processed presentation information to the terminal device 2B, the terminal device 2B outputs the presentation information (step S31), and processing is finished.

As described above, according to the behavior promotion and suppression system of the present Mode of Embodiment 2, because information of the field in which the user has an interest is emphasized and shown from within the presentation information, it is possible for the effect of promoting or suppressing a behavior of the user to be further enhanced.

Mode of Embodiment 3

Figure 13:
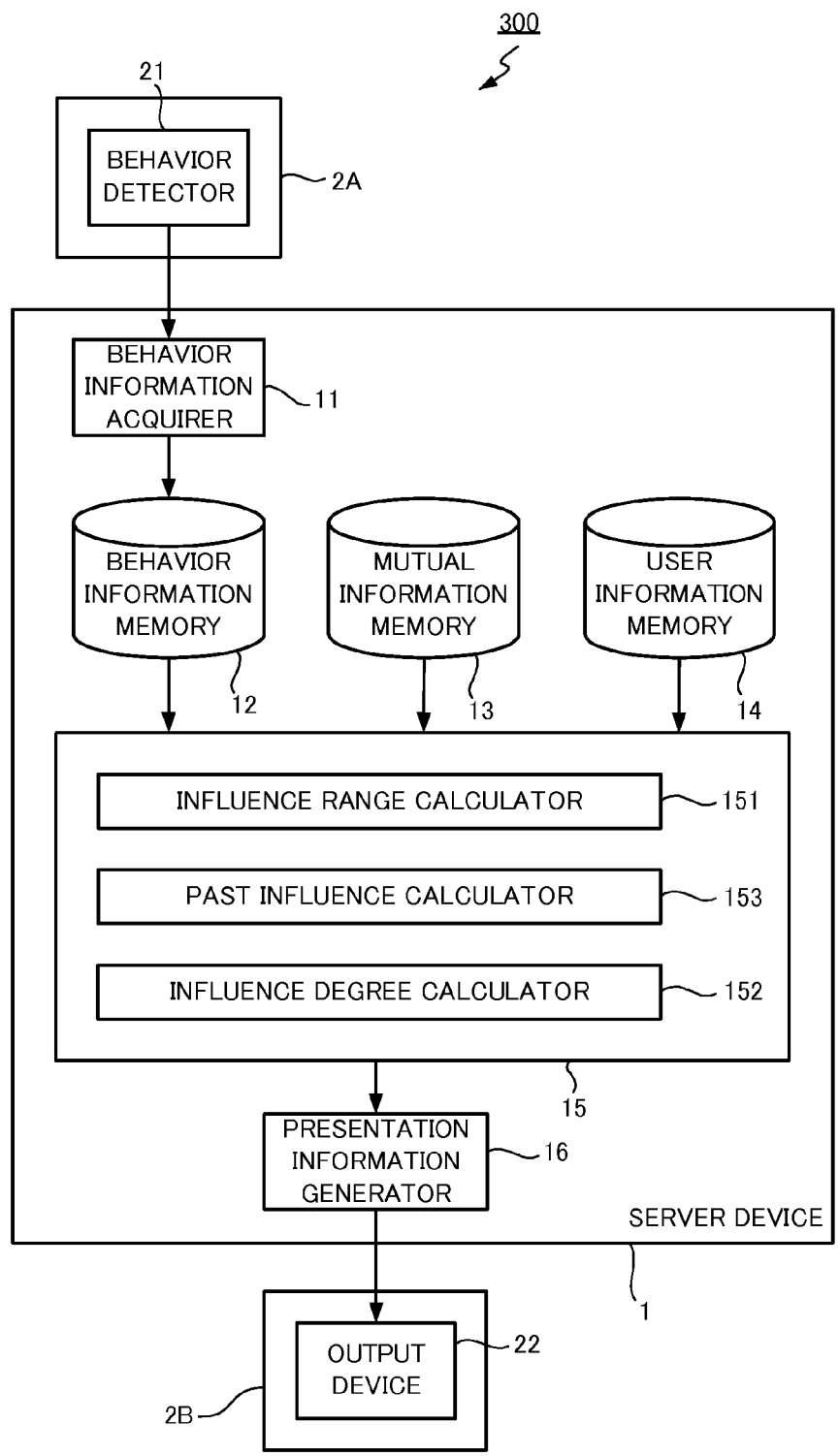
FIG. 13 is a drawing depicting an exemplary configuration of a behavior promotion and suppression system according to Mode of Embodiment 3 of the present invention.

FIG. 13 is a drawing depicting an exemplary configuration of a behavior promotion and suppression system according to Mode of Embodiment 3 of the present invention. The influence calculator 15 of the server device 1 of a behavior promotion and suppression system 300 is provided with a past influence calculator 153 in addition to the influence range calculator 151 and the influence degree calculator 152. In Mode of Embodiment 3, presentation information is generated by combining the influence a behavior carried out by a user has had on another user in the past and the influence a behavior carried out by the user will have on the another user in the future, and the presentation information is presented to the user.

The influence range calculator 151 reads out predetermined behavior information $\alpha$ from among the behavior information stored in the behavior information memory 12. The behavior information $\alpha$ is, for example, behavior information with respect to which a predetermined period has elapsed from the behavior being carried out, behavior information that has been randomly selected, or behavior information that has been selected by the user. If the user is to select the behavior information $\alpha$, the terminal device 2A or the terminal device 2B is provided with an input device, and the server 1 is provided with a receiver that receives information input to the input device of the terminal device 2A or the terminal device 2B. Alternatively, it is permissible for the server 1 to be provided with an input device, and for the user to operate the input device of the server 1 to select the behavior information $\alpha$. The user who carried out the behavior of the behavior information $\alpha$ is user X. The influence range calculator 151 uses the mutual information indicating connections between users that is stored by the mutual information memory 13, and the user information indicating the degree of influence of the users that is stored by the user information memory 14, to calculate the range of influence in the case user X has carried out the behavior of the behavior information $\alpha$.

The past influence calculator 153 extracts a user who has already carried out an influenced behavior from among the users within the range of influence, on the basis of the behavior information stored by the behavior information memory 12. Furthermore, the past influence calculator 153 detects whether or not the users within the range of influence know that the user who carried out the behavior of the behavior information $\alpha$ is user X. The past influence calculator 153 extracts, from among the users within the range of influence who know that the user who carried out the behavior of the behavior information $\alpha$ is user X, a user who has carried out an influenced behavior of the behavior of the behavior information $\alpha$ after knowing that the user who carried out the behavior of the behavior information $\alpha$ is user X.

Detecting that the users within the range of influence know that the user who carried out the behavior of the behavior information $\alpha$ is user X is carried out as follows, for example. The behavior information memory 12 stores raw data, acquired by the behavior information acquirer 11 from the terminal device 2A, such as image data for which a user or a predetermined place has been captured. On the basis of the image data for which a user or a predetermined place has been captured, detection is carried out of the user in question coming to the same place immediately after user X has carried out the behavior of the behavior information α, or detection is carried out of the user in question being present in an image in which user X is carrying out the behavior of the behavior information α. Alternatively, if a device for informing that user X has carried out the behavior of the behavior information α is provided in the place where user X carried out the behavior of the behavior information α, it is determined that the user in question knows that the user who carried out the behavior of the behavior information α is user X. Furthermore, it is permissible for the user in question him or herself to input that he or she knows that the user who carried out the behavior of the behavior information α is user X.

The influence degree calculator 152 uses the user information to calculate the degree of influence on another user within the range of influence, from a user who has already carried out an influenced behavior.

The influence range calculator 151, the past influence calculator 153, and the influence degree calculator 152 carry out these calculations, for example, for each preset period of one day after the user has carried out the behavior of the behavior information α, the present time, and one month after the user has carried out the behavior of the behavior information α. The presentation information generator 16 generates presentation information for promoting or suppressing the behavior in question, depicting the way in which the influence caused by the user carrying out the behavior of the behavior information α has propagated up to one day after the user carried out the behavior of the behavior information α and the present time, and the way in which the influence propagates to one month after the user carried out the behavior of the behavior information α, and transmits the presentation information to the terminal device 2B.

Figure 14:
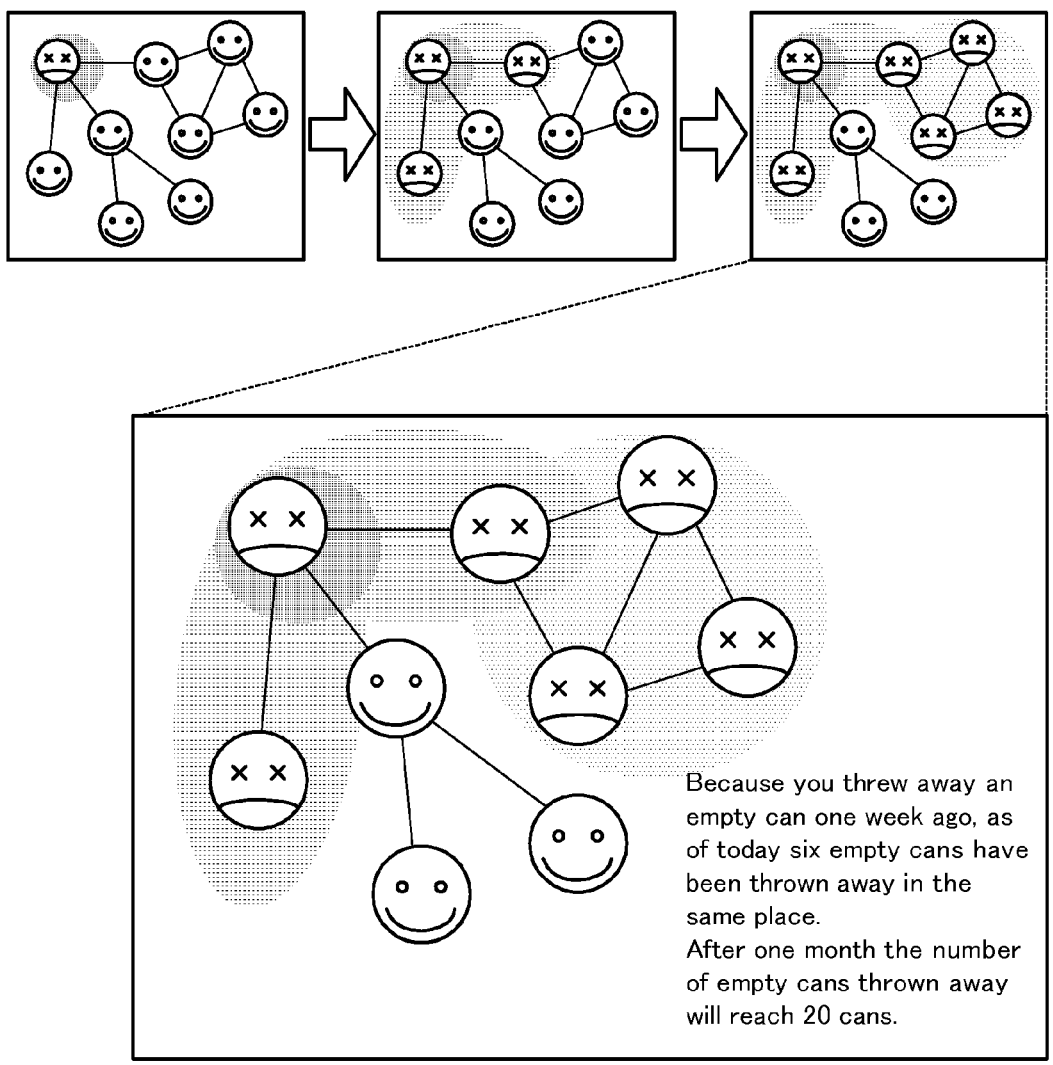
FIG. 14 is a drawing depicting an example of presentation information that suppresses the behavior of a user and is generated by a presentation information generator according to Mode of Embodiment 3.

FIG. 14 is a drawing depicting an example of presentation information that suppresses the behavior of a user and is generated by a presentation information generator according to Mode of Embodiment 3. The presentation information of FIG. 14 is an example of presentation information for suppressing a selfish behavior classified under a category such as deviant behavior. In the example of FIG. 14, presentation information depicting influence (past influence) at one day after the user carried out a certain behavior and of the present time, and depicting influence (future influence) at one month after the user carried out the certain behavior is generated.

The influence range calculator 151 of the influence calculator 15 reads out "carelessly thrown away an empty can" (deviant behavior) as the behavior information α, from the behavior information stored in the behavior information memory 12. The influence range calculator 151, with respect to "carelessly throw away an empty can" (deviant behavior), refers to the mutual information depicted in FIG. 4 and the user information depicted in FIG. 5, and calculates the range of influence in the case user A has carelessly thrown away an empty can.

First, the influence range calculator 151 calculates the range of influence at one day after user A has carelessly thrown away the empty can. As a result thereof, the influence range calculator 151 calculates that the two users of user B and user C are influenced one day after. Moreover, the influence range calculator 151 refers to the date and time of the behavior information α, and calculates at the present time how many days have elapsed after the "carelessly throw away an empty can" (deviant behavior) being carried out. In this case, it is assumed that one week has elapsed.

Furthermore, the influence range calculator 151 calculates the range of influence at one week after (the present time) user A carelessly threw away the empty can. As a result thereof, the influence range calculator 151 calculates that there is an influence, from the behavior of user A, from user A to the five users of user B, user C, user E, user F, and user I, one week after user A carelessly threw away the empty can. Furthermore, the influence range calculator 151 calculates the range of influence at one month after user A carelessly threw away the empty can.

The past influence calculator 153 receives, from the influence range calculator 151, the range of influence (user B and user C) at one day after user A carelessly threw away the empty can. The past influence calculator 153 refers to the behavior information stored by the behavior information memory 12, and determines whether or not user B and user C carried out the influenced behavior of "carelessly throw away the empty can" knowing that the user who carelessly threw away the empty can was user A, within one day after user A carelessly threw away an empty can. In this case, user B and user C carried out the influenced behavior of "carelessly throw away the empty can".

Next, the past influence calculator 153 receives, from the influence range calculator 151, the range of influence (user B, user C, user E, user F, and user I) at one week after user A carelessly threw away the empty can. The past influence calculator 153 refers to the behavior information stored by the behavior information memory 12, and determines whether or not user E, user F, and user I carried out the influenced behavior of "carelessly throw away the empty can" knowing that it was user B and user C who carelessly threw away empty cans, within one week after user A carelessly threw away the empty can. In this case, user E, user F, and user I also carried out the influenced behavior of "carelessly throw away the empty can".

In this way, the past influence calculator 153, for each preset period, extracts a user who has already carried out an influenced behavior from among the users within the range of influence calculated by the influence range calculator 151. As a result of this, it is understood that, at the present time, user B, user C, user E, user F, and user I have thrown away an empty can in the same place. It is assumed that each user has thrown away one empty can each, and that at the present time six empty cans have been thrown away.

The influence degree calculator 152 receives, from the influence range calculator 151, the range of influence at one month after user A carelessly threw away the empty can. The influence degree calculator 152 refers to the user information of FIG. 4, and for the case in which user B, user C, user E, user F, and user I have carried out the influenced behavior of "carelessly throw away the empty can" (deviant behavior), calculates the degree of influence from user A to each user within the range of influence at one month after user A carelessly threw away the empty can. The influence degree calculator 152 calculates, as an expected value for the number of empty cans carelessly thrown away by each user, a number by multiplying the degree of influence from user B, user C, user E, user F, or user I to each user within the range of influence at one month after user A carelessly threw away the empty can, by the number of empty cans carelessly thrown away by user B, user C, user E, user F, or user I, and totals the expected values and thus calculates the expected value for the number of empty cans to be additionally thrown away up to one month after. In this case, the expected value for the number of empty cans to be additionally thrown away from one week after (the present time) user A carelessly threw away the empty can up to one month after is 14 cans. As a result of this, at one month after, it is predicted that the number of empty cans thrown away will reach 6 cans+14 cans=20 cans.

When the presentation information generator 16 receives these calculation results, a message is generated stating that "Because you threw away an empty can one week ago, as of today six empty cans have been thrown away in the same place. After one month the number of empty cans thrown away will reach 20 cans.", indicating the consequent result of the behavior and the result predicted to be caused in the future. The presentation information generator 16 combines the calculation results of the influence range calculator 151, the influence degree calculator 152, and the past influence calculator 153 with the generated message, and generates presentation information such as that depicted in FIG. 14, indicating the past influence of the behavior carried out by the user and the future influence of the behavior carried out by the user.

It should be noted that it is permissible for the influence calculator 15 to be provided with the influence range calculator 151, the past influence calculator 153, and the presentation information generator 16, and for the presentation information generator 16 to generate presentation information indicating only the users (the past influence of behaviors carried out by users) who have carried out an influenced behavior up to the present time, extracted by the past influence calculator 153 from among the users within the range of influence calculated by the influence range calculator 151.

User A who has seen this kind of presentation information is able to know the future influence of his or her selfish behavior and also know that his or her selfish behavior has already been the trigger for the selfish behavior of another user, and it is feasible to expect that user A will think "next time I will stop this kind behavior" and that the selfish behavior will be suppressed.

Figure 15:
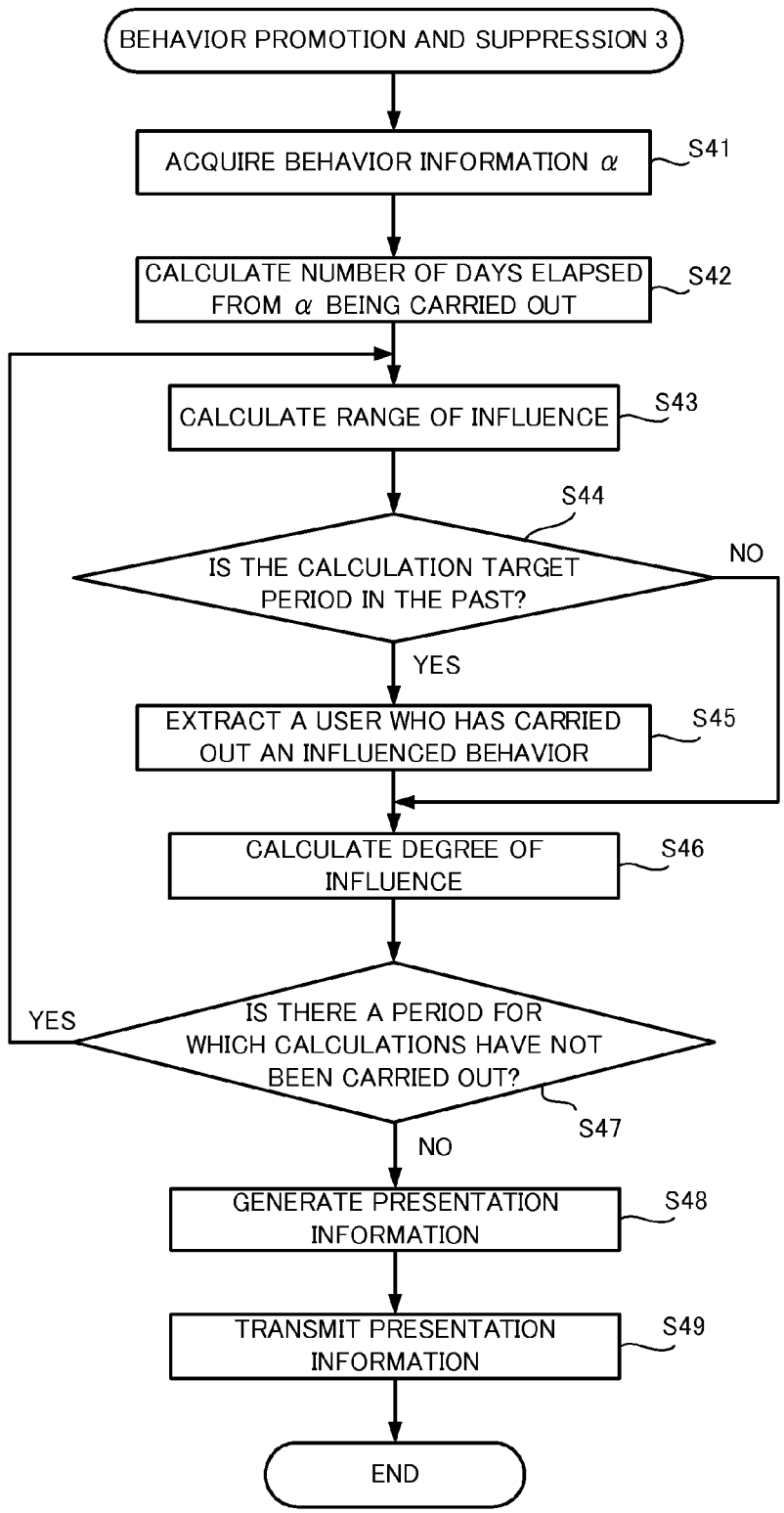
FIG. 15 is a flowchart depicting an example of a behavior promotion and suppression operation according to Mode of Embodiment 3.

FIG. 15 is a flowchart depicting an example of a behavior promotion and suppression operation according to Mode of Embodiment 3. The influence range calculator 151 of the influence calculator 15 acquires the behavior information α from the behavior information memory 12 (step S41). The number of days that have elapsed since the user carried out the behavior of the behavior information α is calculated (step S42). The influence range calculator 151 uses the mutual information indicating connections between users that is stored by the mutual information memory 13, and the user information indicating the degree of influence of the users that is stored by the user information memory 14, to calculate the range of influence in the case the user has carried out the behavior of the behavior information α (step S43).

If the calculation target period is in the past, namely a date and time prior to the present time (step S44: YES), the past influence calculator 153 extracts a user who has already carried out an influenced behavior from among the users within the range of influence, on the basis of the behavior information stored by the behavior information memory 12 (step S45). If the calculation target period is not in the past (step S44: NO), step S45 is not carried out. The influence degree calculator 152 uses the user information and calculates the degree of influence from a user who has already carried out an influenced behavior, to another user within the range of influence (step S46). The calculations of the influence range calculator 151 and the influence degree calculator 152 are carried out for each preset period of after one day, after one week, and after one month. If there is a period for which calculations have not been carried out (step S47: YES), processing returns to step S43, and step S43 to step S47 are repeated.

If there is no period for which calculations have not been carried out (step S47: NO), the presentation information generator 16 generates presentation information depicting the way in which the influence of the behavior of the behavior information α carried out by the user has propagated in the past, and the way in which the future influence of the behavior of the behavior information α carried out by the user will propagate (step S48). The presentation information generator 16 transmits the generated presentation information to the terminal device 2B (step S49), and processing is finished.

As described above, according to the behavior promotion and suppression system of the present Mode of Embodiment 3, by indicating, in the presentation information, the past influence in addition to the future influence of a behavior carried out by the user, it is feasible to expect an improvement in the sense of trust of the user with respect to the presentation information. By improving the sense of trust of the user, it is possible to further enhance the effect of promoting or suppressing a behavior of the user.

Mode of Embodiment 4

Figure 16:
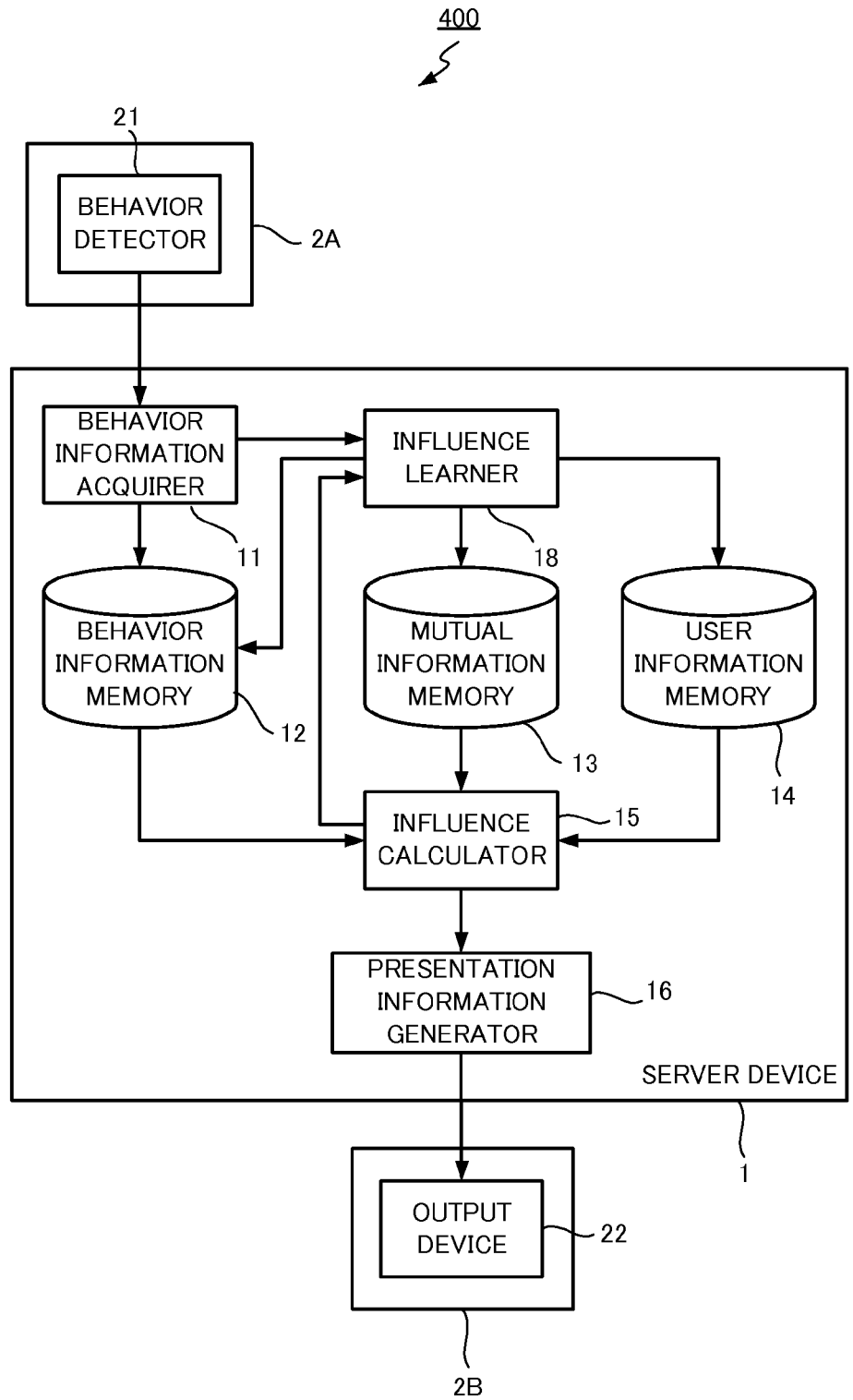
FIG. 16 is a drawing depicting an exemplary configuration of a behavior promotion and suppression system according to Mode of Embodiment 4 of the present invention.

FIG. 16 is a drawing depicting an exemplary configuration of a behavior promotion and suppression system according to Mode of Embodiment 4 of the present invention. A server device 1 of a behavior promotion and suppression system 400 is provided with an influence learner 18 in addition to the configuration of the server device 1 of the behavior promotion and suppression system 100. In Mode of Embodiment 4, the influence learner 18 updates information stored by the behavior information memory 12 and/or the user information memory 14, on the basis of behavior information acquired by the behavior information acquirer 11.

The influence learner 18 updates the user information stored by the user information memory 14, on the basis of behavior information acquired by the behavior information acquirer 11. For example, it is possible for the implementation time included in the user information mentioned in Mode of Embodiment 1 to be the average of the times from user 1 carrying out a certain behavior to user 2 carrying out an influenced behavior of the behavior carried out by user 1. In this case, when the behavior information acquirer 11 acquires behavior information in which user 2 has carried out an influenced behavior of the behavior carried out by user 1, the influence learner 18 calculates the time from the date and time of the behavior information of user 1 to the date and time of the behavior information of user 2, and updates the implementation time. It should be noted that the influence learner 18 carries out the determination as to whether or not the behavior information acquired by the behavior information acquirer 11 is an influenced behavior, in the same way as the past influence calculator 153 described in Mode of Embodiment 3.

Furthermore, it is possible for the degree of influence from user 1 to user 2 included in the user information mentioned in Mode of Embodiment 1 to be defined as the probability of user 2 carrying out an influenced behavior having seen the behavior carried out by user 1 or the result thereof. In this case, the influence learner 18 updates the degree of influence on the basis of the behavior information in which user 2 has carried out an influenced behavior of the behavior carried out by user 1. For example, in the case that up to the present time user 2 has carried out an influenced behavior once with respect to a behavior carried out four times by user 1 resulting in a degree of influence of $1/4=0.25$ being stored, due to user 2 this time carrying out an influenced behavior of the behavior carried out by user 1, the degree of influence becomes $2/5=0.4$.

Further, as mentioned in Mode of Embodiment 1, the user information memory 14 is able to store effect information for each user. In this case, the influence learner 18, on the basis of presentation information acquired from the influence calculator 15, information indicating that the presentation information has been transmitted (for example, information indicating a transmission date and time), and behavior information acquired by the behavior information acquirer 11 after the presentation information has been presented to the user, determines whether or not the behavior of the user has been promoted or suppressed by means of the presentation information. It should be noted that the influence learner 18 determines, by means of the information indicating that the presentation information has been transmitted (for example, information indicating a transmission date and time), whether or not the behavior information acquired by the behavior information acquirer 11 is behavior information of a behavior after the presentation information has been presented to the user.

The influence learner 18 associates, as effect information, the most common behavior category from among the categories of the user behavior promoted or suppressed by means of the presentation information, with the information identifying the user, and stores the effect information in the user information memory 14. It should be noted that it is permissible to calculate the ranking of the category of the user behavior promoted or suppressed by means of the presentation information, and to associate, as effect information, the categories of behaviors up to a predetermined ranking with the information identifying the user. The influence learner 18, each time it is determined that the behavior of the user has been promoted or suppressed by means of the presentation information, determines whether or not there will be a change in the ranking of the most common behavior category from among the categories of the user behaviors promoted or suppressed by means of the presentation information, or in the ranking of the category of the user behavior promoted or suppressed by means of the presentation information. If there will be a change, the effect information stored by the user information memory 14 is updated.

The influence learner 18 updates the behavior list stored by the behavior information memory 12, on the basis of behavior information acquired by the behavior information acquirer 11. For example, after the behavior information acquirer 11 has acquired behavior information indicating the "buy a canned drink" user behavior, behavior information indicating the user behavior of "also pick up other empty cans and throw them away together" is acquired. If the combination of "buy a canned drink" and "also pick up other empty cans and throw them away together" is not in the behavior list, the influence learner 18 adds and stores this combination in the behavior list.

Furthermore, if the assumed subject numerical value mentioned in Mode of Embodiment 1 is the average of numerical values indicating a number or amount of the subjects for behaviors carried out by a user in the past, the influence learner 18 specifies a subject numerical value of the behavior in question on the basis of the behavior information of the behavior carried out by the user, and updates the assumed subject numerical value.

Furthermore, it is possible for the server 1 of the behavior promotion and suppression system 200 depicted in FIG. 10 to be provided with the influence learner 18 and, as mentioned in Mode of Embodiment 2, for the field of the information that is included most in the presentation information, by which the behavior of the user has been promoted or suppressed, to serve as the field in which the user has an interest, and to be associated with information identifying the user in question and serve as interest information. In this case, the influence learner 18, on the basis of presentation information acquired from the presentation information processor 17, information indicating that the presentation information has been transmitted (for example, information indicating a transmission date and time), and behavior information acquired by the behavior information acquirer 11 after the presentation information has been presented to the user by the presentation information processor 17, determines whether or not the behavior of the user has been promoted or suppressed by means of the presentation information. The influence learner 18, each time it is determined that the behavior of the user has been promoted or suppressed by means of the presentation information, determines whether or not there will be a change in the field of the information that is included most in the presentation information by which the behavior of the user has been promoted or suppressed. If there will be change, the interest information of the user is updated. It should be noted that it is permissible for the behavior information to be analyzed, the ranking of the field of the information of which a lot is included in the presentation information, by which the behavior of the user has been promoted or suppressed, to be calculated, for fields up to a predetermined ranking to serve as fields in which the user has an interest, and for these fields to be associated with information identifying the user and to serve as interest information.

Figure 17:
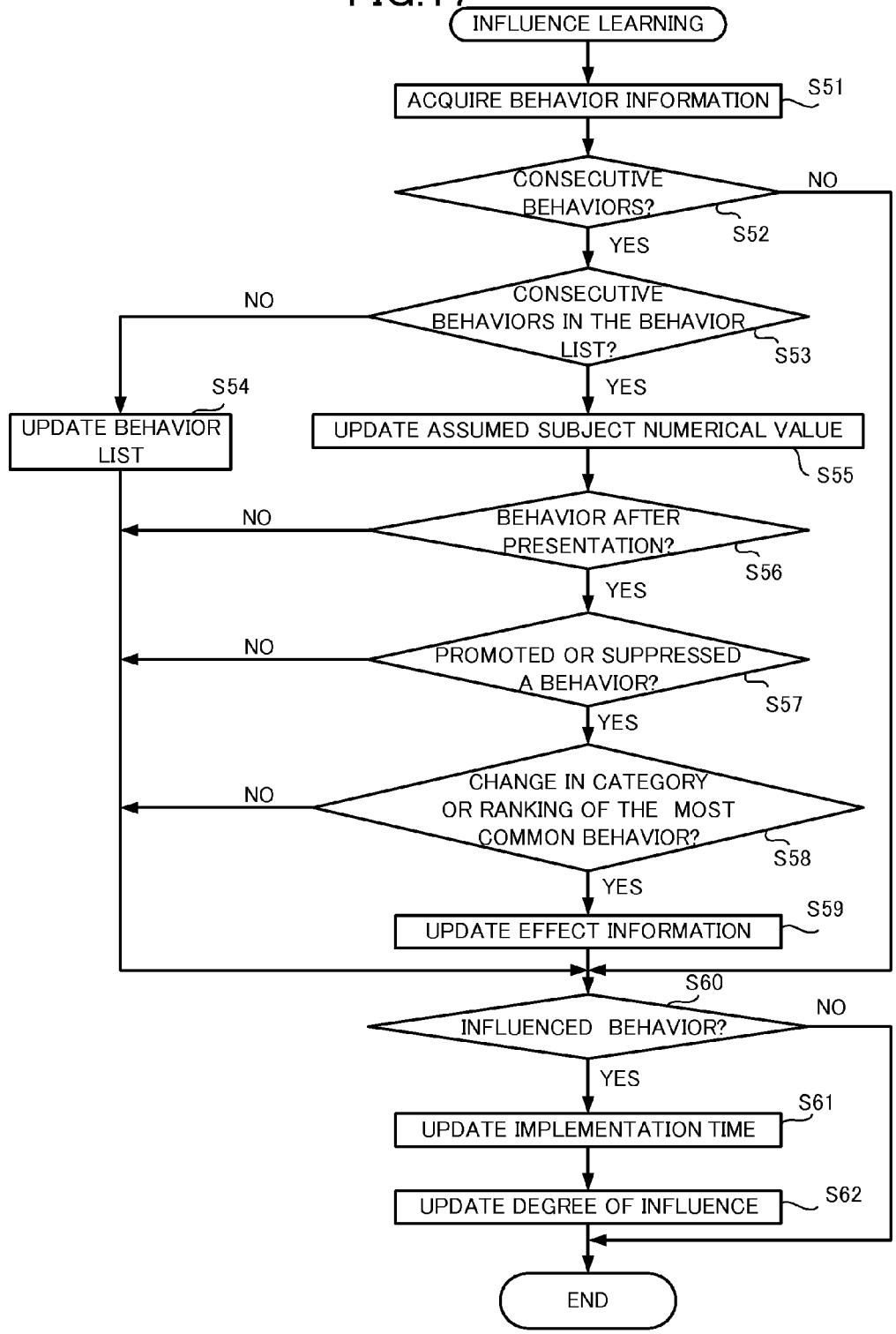
FIG. 17 is a flowchart depicting an example of an influence learning operation according to Mode of Embodiment 4.

FIG. 17 is a flowchart depicting an example of an influence learning operation according to Mode of Embodiment 4. When the behavior detector 21 of the terminal device 2A senses a user, that behavior is detected and converted into data, and the data is associated with identification information that identifies the user and the date and time at which the behavior of the user was detected, and is transmitted as behavior information to the behavior information acquirer 11 of the server device 1.

The behavior information acquirer 11 acquires behavior information from the behavior detector 21 (step S51). When the behavior information acquirer 11 acquires the behavior information, the influence learner 18 determines whether or not the behavior information is of consecutive behaviors by determining whether or not there is behavior information of the same user acquired within a predetermined time from the time at which the behavior information was acquired (step S52). If the behavior information is not of consecutive behaviors (step S52: NO), the processing proceeds to step S60. If the behavior information is of consecutive behaviors (step S52: YES), the influence learner 18 determines whether or not a combination of the consecutive behaviors is present in the behavior list stored by the behavior information memory 12 (step S53).

If there is no combination of the consecutive behaviors in the behavior list (step S53: NO), the influence learner 18 adds the combination of the consecutive behaviors to the behavior list and updates the behavior list (step S54), and processing proceeds to step S60. If there is a combination of the consecutive behaviors in the behavior list (step S53: YES), the influence learner 18 updates the assumed subject numerical value on the basis of the behavior information acquired by the behavior information acquirer 11 (step S55).

The influence learner 18 determines whether or not the user behavior indicated by the behavior information acquired by the behavior information acquirer 11 is a behavior after the presentation information has been seen (step S56). If the user behavior is not a behavior after the presentation information has been seen (step S56: NO), processing proceeds to step S60. If the user behavior is a behavior after the presentation information has been seen (step S56: YES), the influence learner 18 determines whether or not the presentation information has promoted or suppressed a behavior of the user, on the basis of the behavior information acquired by the behavior information acquirer 11 (step S57). If the presentation information has not promoted or suppressed a behavior of the user (step S57: NO), processing proceeds to step S60.

If the presentation information has promoted or suppressed a behavior of the user (step S57: YES), the influence learner 18 determines whether or not there will be a change in the ranking of the most common category from among the categories of the user behaviors promoted or suppressed by means of the presentation information, or in the ranking of the category of the user behavior promoted or suppressed by means of the presentation information (step S58). If there will not be a change (step S58: NO), processing proceeds to step S60. If there will be a change (step S58: YES), the effect information of the user in question is updated (step S59).

It should be noted that if the server 1 of the behavior promotion and suppression system 200 is provided with the influence learner 18, and the field of the information that is included most in the presentation information by which the behavior of the user is promoted or suppressed, or the fields up to a predetermined ranking of information of which a lot is included, serves as the field in which the user has an interest, and is associated with information identifying the user in question and serves as interest information, the influence learner 18 determines here whether or not there will be a change in the field of the information that is included most in the presentation information by which the behavior of the user is promoted or suppressed, or in the ranking of the information of which a lot is included, and if there will not be a change, processing proceeds to step S60. If there will be change, the interest information of the user is updated.

The influence learner 18 determines whether or not the user behavior indicated by the behavior information acquired by the behavior information acquirer 11 is an influenced behavior, by determining whether or not there is another user who was carrying out the same behavior as the user in question within a predetermined time from the time at which the behavior information was acquired (step S60). If the user behavior is not an influenced behavior (step S60: NO), processing is finished. If the user behavior is an influenced behavior (step S60: YES), the influence learner 18 calculates the time from the date and time of the behavior information of the other user to the date and time of the behavior information of the user in question, and on the basis of this, updates the implementation time of the user information indicating a connection between the user in question and the other user (step S61). Furthermore, because the user in question carried out an influenced behavior of the other user, the influence learner 18 updates the influence degree of the user information indicating a connection between the user in question and the other user (step S62), and processing is finished.

As described above, according to the behavior promotion and suppression system of the present Mode of Embodiment 4, it is possible for the accuracy of the influence calculation of the influence calculator 15 to be increased, and it is feasible to expect an improvement in the sense of trust of the user with respect to the presentation information. By improving the sense of trust of the user, it is possible to further enhance the effect of promoting or suppressing a behavior of the user.

Figure 18:
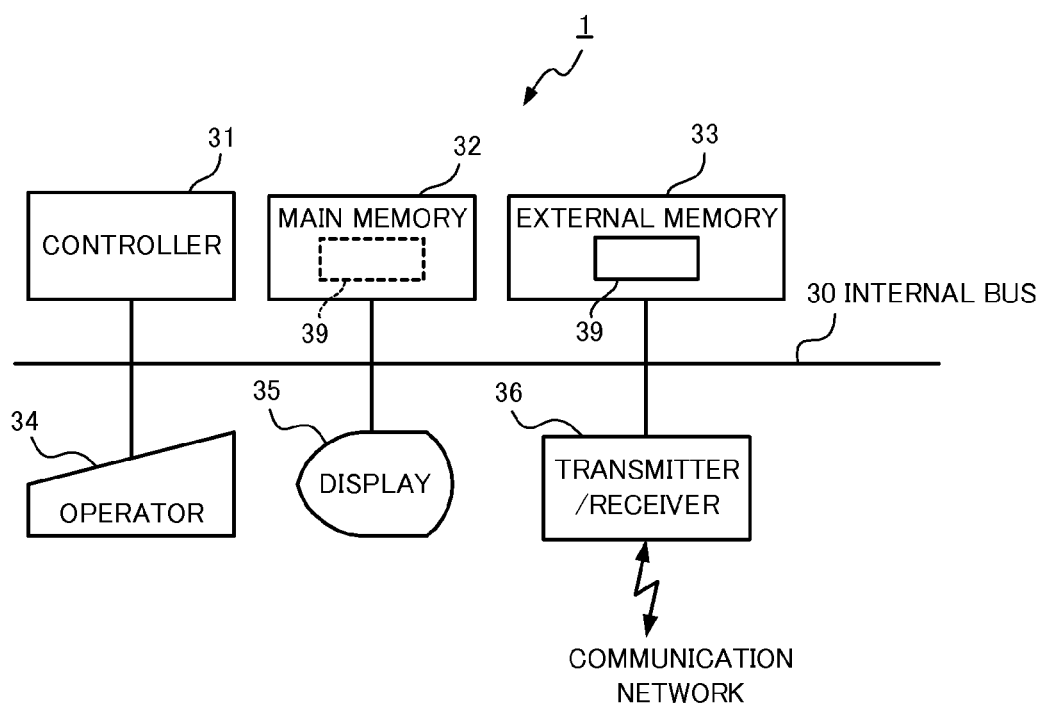
FIG. 18 is a drawing depicting an example of a hardware configuration of a server device according to the modes of embodiment of the present invention.

FIG. 18 is a drawing depicting an example of a hardware configuration of a server device according to the modes of embodiment of the present invention. The server device 1, as depicted in FIG. 18, is provided with a controller 31, a main memory 32, an external memory 33, an operator 34, a display 35, and a transmitter/receiver 36. The main memory 32, external memory 33, operator 34, display 35, and transmitter/receiver 36 are all connected to the controller 31 by way of an internal bus 30.

The controller 31 comprises a CPU (central processing unit) or the like, and carries out each processing operation in accordance with a control program 39 stored in the external memory 33. The controller 31 carries out each processing operation for the behavior information acquirer 11, the influence calculator 15, the presentation information generator 16, the presentation information processor 17, and the influence learner 18.

The main memory 32 comprises RAM (random-access memory) or the like, has the control program 39 stored in the external memory 33 loaded thereinto, and is used as a work area for the controller 31.

The external memory 33 comprises non-volatile memory such as flash memory, a hard disk, DVD-RAM (digital versatile disc random-access memory), and DVD-RW (digital versatile disc rewritable), stores, in advance, a program for causing the controller 31 to carry out the processing of the server device 1, and furthermore, in accordance with an instruction of the controller 31, supplies data stored by this program to the controller 31, and stores the data supplied from the controller 31. The external memory 33 comprises the behavior information memory 12, the mutual information memory 13, and the user information memory 14.

The operator 34 comprises a keyboard and a pointing device such as a mouse, or the like, and an interface device that connects the keyboard and pointing device or the like to the internal bus 30. If the user inputs the implementation time and the degree of influence for the user information, or inputs the interest information, and so on, instructions are supplied to the controller 31 by way of the operator 34.

The display 35 comprises a CRT (cathode ray tube) or an LCD (liquid crystal display) or the like, and if the user inputs the implementation time and the degree of influence for the user information, or inputs interest information, and so on, an operation screen is displayed.

The transmitter/receiver 36 comprises a network termination device or a wireless communication device that connects to a communication network, and a serial interface or a LAN (local area network) interface that connects thereto. The behavior information acquirer 11, influence calculator 15, and presentation information processor 17 are connected to the communication network by way of the transmitter/receiver 36, and transmit and receive information with the terminal 2A or the terminal 2B.

Processing for the behavior information acquirer 11, influence calculator 15, presentation information generator 16, presentation information processor 17, and influence learner 18 depicted in FIG. 1, FIG. 6, FIG. 10, FIG. 13, and FIG. 16 is executed by the control program 39 carrying out processing using the controller 31, main memory 32, external memory 33, operator 34, display 35, and transmitter/receiver 36 and so on as resources.

Otherwise, the hardware configurations and flowcharts are examples, and it is possible for these to be altered and modified in an arbitrary manner.

It is possible for the central portion for carrying out the behavior promotion and suppression processing comprising the controller 31, main memory 32, external memory 33, operator 34, and internal bus 30 and so on to be implemented using an ordinary computer system without resorting to a special system. For example, it is permissible to configure a behavior promotion and suppression system in which the processing is executed by a computer program for executing the aforementioned operations being stored and distributed on a computer-readable recording medium (a flexible disk, CD-ROM, DVD-ROM, or the like), and the computer program being installed on a computer. Furthermore, it is permissible to configure the behavior promotion and suppression system by storing the computer program in a storage device of a server device on a communication network such as the Internet, and the computer program being downloaded and so on by an ordinary computer system.

Furthermore, if the functions of the behavior promotion and suppression system are assigned between an OS (operating system) and an application program, or implemented by means of cooperation between an OS and an application program, and so on, it is permissible for only the application program portion to be stored on the recording medium or storage device.

Moreover, it is possible for the computer program to be superimposed on a carrier wave, and distributed by way of a communication network. For example, it is permissible for the computer program to be posted on a bulletin board (BBS: bulletin board system) on a communication network, and for the computer program to be distributed by way of the communication network. It is then permissible to configure the system in such a way that the processing is able to be executed by running this computer program, and, under the control of the OS, executing the program in the same way as other application programs.

It is possible for some or all of the aforementioned modes of embodiment to be described also as in the following appendices, but are not restricted to the following.

APPENDIX 1

A server device including:
a behavior list memory that stores a behavior list indicating combinations of behaviors and subsequent possible behaviors of a user;
a mutual information memory that stores mutual information representing connections between users;
a user information memory that stores user information representing an influence of a behavior of the users;
a behavior information acquirer that acquires behavior information including information representing a behavior carried out by the user and information identifying the user;
an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior; and
a presenter that generates presentation information including the influence the behavior in question has on the another user in the case the user has carried out the subsequent possible behavior, the influence having been calculated by the influence calculator, and presents the presentation information to the user.

APPENDIX 2

The server device according to Appendix 1, wherein the influence calculator includes:

an influence range calculator that, on the basis of the mutual information and the user information, calculates a range of influence indicating a range of other users who are inferred to carry out a similar behavior having seen the behavior in question or the result thereof in the case the user has carried out the subsequent possible behavior; and
an influence degree calculator that, on the basis of the user information, calculates a degree of influence indicating the probability of the other users carrying out a similar behavior having seen the behavior in question or the result thereof in the case the user has carried out the subsequent possible behavior, and
the presenter generates the presentation information including at least either the range of influence or the degree of influence respectively calculated by the influence range calculator and the influence degree calculation means.

APPENDIX 3

The server device according to Appendix 2, wherein
the influence range calculator calculates the range of influence for each predetermined period,
the influence degree calculator calculates the degree of influence for each of the predetermined periods, and
the presenter generates the presentation information including the range of influence and the degree of influence for each of the predetermined periods.

Appendix 4

The server device according to any of Appendices 1 to 3, wherein
the user information memory additionally stores interest information indicating a field in which the user has an interest, and
the server device is additionally provided with a presentation information processor that determines whether or not the presentation information includes information of a field corresponding to the interest information, and if included, carries out processing that emphasizes the information in question.

APPENDIX 5

The server device according to any of Appendices 1 to 4, wherein
the server device is additionally provided with a behavior information memory that stores the behavior information acquired by the behavior information acquirer, and
the influence calculator includes a past influence calculator that, with respect to the behavior information stored by the behavior information memory, extracts another user who has carried out a similar behavior after knowing that the person who carried out the behavior indicated by the behavior information is the user.

APPENDIX 6

The server device according to any of Appendices 1 to 5, wherein the server device is additionally provided with an influence learner including at least either one of:
a behavior list updater that updates the behavior list on the basis of the behavior information; or
a user information updater that, on the basis of the behavior information, updates the user information representing the influence of the behaviors of the user and the another user in the case the another user has carried out a similar behavior after knowing that the person who carried out the behavior indicated by the behavior information is the user.

APPENDIX 7

The server device according to any of Appendices 2 to 6, wherein
the user information memory additionally stores a numerical value for which a number or amount of the subjects for subsequent possible behaviors of the user is assumed,
the influence degree calculator additionally calculates an expected value for which the numerical value is multiplied by a degree of influence, and
the presenter generates the presentation information including at least any of the range of influence, the degree of influence, or the expected value.

APPENDIX 8

A behavior promotion and suppression system including:
a terminal device provided with a behavior detector that detects a behavior carried out by a user, generates behavior information including information representing the behavior carried out by the user and information identifying the user, and transmits the behavior information to a server device;
and the server device including
a behavior list memory that stores a behavior list indicating combinations of behaviors and subsequent possible behaviors of the user,
a mutual information memory that stores mutual information representing connections between users,
a user information memory that stores user information representing an influence of a behavior of the users,
a behavior information acquirer that acquires the behavior information from the terminal device,
an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior, and
a presenter that generates presentation information including the influence the behavior in question has on the another user in the case the user has carried out the subsequent possible behavior, the influence having been calculated by the influence calculator, and presents the presentation information to the user.

APPENDIX 9

A behavior promotion and suppression method including
the following step to be executed by a terminal device:
a behavior detection step in which a behavior carried out by a user is detected, behavior information including information representing the behavior carried out by the user and information identifying the user is generated and transmitted to a server device; and
the following steps to be executed by the server device:
a behavior information acquisition step in which the behavior information is acquired from the terminal device;
an influence calculation step in which a subsequent possible behavior of the user who has carried out the behavior indicated in the behavior information acquired in the behavior information acquisition step is acquired from a behavior list indicating combinations of behaviors and subsequent possible behaviors of the user and stored by a behavior list memory, and in which the influence the behavior in question has on another user who has a connection with the user and has seen the behavior in question or the result thereof in the case the user has carried out the subsequent possible behavior is calculated on the basis of mutual information that is stored by a mutual information memory and represents a connection between the users and user information that is stored by a user information memory and represents an influence of a behavior of the users, the influence including a percentage at which it is inferred that the another user carries out a similar behavior; and
a presentation step in which presentation information including the influence the behavior in question has on the another user in the case the user has carried out the subsequent possible behavior is generated, the influence having been calculated in the influence calculation step, and the presentation information is presented to the user.

APPENDIX 10

The behavior promotion and suppression method according to Appendix 9, wherein the influence calculation step includes:
an influence range calculation step in which a range of influence indicating a range of other users who are inferred to carry out a similar behavior having seen the behavior in question or the result thereof in the case the user has carried out the subsequent possible behavior is calculated on the basis of the mutual information and the user information; and
an influence degree calculation step in which a degree of influence indicating the probability of the other users carrying out a similar behavior having seen the behavior in question or the result thereof in the case the user has carried out the subsequent possible behavior is calculated on the basis of the user information, and
in the presentation step, the presentation information including at least either the range of influence or the degree of influence respectively calculated in the influence range calculation step and the influence degree calculation step is generated.

APPENDIX 11

The behavior promotion and suppression method according to Appendix 10, wherein the range of influence for each predetermined period is calculated in the influence range calculation step,
the degree of influence for each of the predetermined periods is calculated in the influence degree calculation step, and
the presentation information including the range of influence and the degree of influence for each of the predetermined periods is generated in the presentation step.

APPENDIX 12

The behavior promotion and suppression method according to any of Appendices 9 to 11, further including a presentation information processing step in which it is determined whether or not the presentation information includes information of a field corresponding to interest information that is additionally stored by the user information memory and indicates a field in which the user has an interest, and if included, processing that emphasizes the information in question is carried out.

APPENDIX 13

The behavior promotion and suppression method according to any of Appendices 9 to 12, wherein the influence calculation step includes a past influence calculation step in which, with respect to the behavior information stored by the behavior information memory that stores the behavior information acquired in the behavior information acquisition step, another user who has carried out a similar behavior after knowing that the person who carried out a behavior indicated by the behavior information is the user is extracted.

APPENDIX 14

The behavior promotion and suppression method according to any of Appendices 9 to 13, wherein the behavior promotion and suppression method is additionally provided with an influence learning step including at least either one of:

a behavior list update step in which the behavior list is updated on the basis of the behavior information; or a user information update step in which the user information representing the influence of the behaviors of the user and the another user in the case the another user has carried out a similar behavior after knowing that the person who carried out the behavior indicated by the behavior information is the user is updated on the basis of the behavior information.

APPENDIX 15

The behavior promotion and suppression method according to any of Appendices 10 to 14, wherein, in the influence degree calculation step, an expected value for which a numerical value is multiplied by a degree of influence is additionally calculated, the numerical value being additionally stored by the user information memory and for which a number or amount of the subjects for subsequent possible behaviors of the user is assumed, and in the presentation step, the presentation information including at least any of the range of influence, the degree of influence, or the expected value is generated.

APPENDIX 16

A computer-readable recording medium storing a program causing a computer to function as:

a behavior list memory that stores a behavior list indicating combinations of behaviors and subsequent possible behaviors of a user;

a mutual information memory that stores mutual information representing connections between users;

a user information memory that stores user information representing an influence of a behavior of the users;

a behavior information acquirer that acquires behavior information including information representing a behavior carried out by the user and information identifying the user;

an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof in the case the user has carried out the subsequent possible behavior, the influence including a percentage at which it is inferred that the another user carries out a similar behavior; and a presenter that generates presentation information including the influence the behavior in question has on the another user in the case the user has carried out the subsequent possible behavior, the influence having been calculated by the influence calculator, and presents the presentation information to the user.

It is possible for the present invention to have various types of modes of embodiment and for these to be modified without departing from the broad purpose of the invention. The above-mentioned modes of embodiment are for describing the present invention, and are not intended to limit the scope of the present invention. The scope of the present invention is indicated by means of the appended claims rather than the modes of embodiment. Various types of modifications implemented within the scope of the claims or within a scope equivalent to that of the claims of the invention are included in the scope of the present invention.

The present application claims the priority based upon Japanese Patent Application No. 2010-292533 including the specification, scope of the claims, drawings, and abstract, filed on Dec. 28, 2010. The disclosed contents of the patent application which forms the basis hereof are incorporated in their entirety in the present application by reference.

INDUSTRIAL APPLICABILITY

The present invention is able to be employed in a system in which the behavior of a person is promoted and suppressed by simulating the influence the behavior of the person has on another person and presenting the simulation results.

REFERENCE SIGNS LIST

1 Server device
11 Behavior information acquirer
12 Behavior information memory
13 Mutual information memory
14 User information memory
15 Influence calculator
16 Presentation information generator
17 Presentation information processor
18 Influence learner
2A, 2B Terminal device
21 Behavior detector
22 Output device
30 Internal bus
31 Controller
32 Main memory
33 External memory
34 Operator
35 Display
36 Transmitter/receiver
39 Control program
151 Influence range calculator
152 Influence degree calculator
153 Past influence calculator
100, 200, 300, 400 Behavior promotion and suppression system

What is claimed is:

1. A server device comprising: a behavior list memory that stores a behavior list indicating combinations of behaviors and subsequent possible behaviors of a user; a mutual information memory that stores mutual information representing connections between users; a user information memory that stores user information representing an influence of a behavior of the users; a behavior information acquirer that acquires behavior information including information representing a behavior carried out by the user and information identifying the user; a behavior information memory that stores the behavior information acquired by the behavior information acquirer, an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof when the user has carried out the subsequent possible behavior, the influence including a percentage which infers that the another user carries out a similar behavior; and a presenter that generates, based on information pre-stored corresponding to the behavior and required to generate presentation information, presentation information including the influence the behavior in question has on the another user when the user has carried out the subsequent possible behavior, the influence having been calculated by the influence calculator, and presents the presentation information to the user; wherein the influence calculator includes a past influence calculator that, with respect to the behavior information stored by the behavior information memory, extracts another user who has carried out a similar behavior after knowing that the person who carried out the behavior indicated by the behavior information is the user.

2. The server device according to claim 1, wherein the influence calculator includes: an influence range calculator that, on the basis of the mutual information and the user information, calculates a range of influence indicating a range of other users who are inferred to carry out a similar behavior having seen the behavior in question or the result thereof when the user has carried out the subsequent possible behavior; and an influence degree calculator that, on the basis of the user information, calculates a degree of influence indicating the probability of the other users carrying out a similar behavior having seen the behavior in question or the result thereof when the user has carried out the subsequent possible behavior, and the presenter generates the presentation information including at least either the range of influence or the degree of influence respectively calculated by the influence range calculator and the influence degree calculation means.

3. The server device according to claim 2, wherein
the influence range calculator calculates the range of influence for each predetermined period,
the influence degree calculator calculates the degree of influence for each of the predetermined periods, and
the presenter generates the presentation information including the range of influence and the degree of influence for each of the predetermined periods.

4. The server device according to claim 3, wherein
the user information memory additionally stores interest information indicating a field in which the user has an interest, and
the server device is additionally provided with a presentation information processor that determines whether or not the presentation information includes information of a field corresponding to the interest information, and if included, carries out processing that emphasizes the information in question.

5. The server device according to claim 3, wherein
the server device is additionally provided with a behavior information memory that stores the behavior information acquired by the behavior information acquirer, and
the influence calculator includes a past influence calculator that, with respect to the behavior information stored by the behavior information memory, extracts another user who has carried out a similar behavior after knowing that the person who carried out the behavior indicated by the behavior information is the user.

6. The server device according to claim 3, wherein the server device is additionally provided with an influence learner including at least either one of: a behavior list updater that updates the behavior list on the basis of the behavior information; or a user information updater that, on the basis of the behavior information, updates the user information representing the influence of the behaviors of the user and the another user when the another user has carried out a similar behavior after knowing that the person who carried out the behavior indicated by the behavior information is the user.

7. The server device according to claim 3, wherein
the user information memory additionally stores a numerical value for which a number or amount of the subjects for subsequent possible behaviors of the user is assumed,
the influence degree calculator additionally calculates an expected value for which the numerical value is multiplied by a degree of influence, and
the presenter generates the presentation information including at least any of the range of influence, the degree of influence, or the expected value.

8. The server device according to claim 2, wherein
the user information memory additionally stores a numerical value for which a number or amount of the subjects for subsequent possible behaviors of the user is assumed,
the influence degree calculator additionally calculates an expected value for which the numerical value is multiplied by a degree of influence, and
the presenter generates the presentation information including at least any of the range of influence, the degree of influence, or the expected value.

9. The server device according to claim 2, wherein
the user information memory additionally stores interest information indicating a field in which the user has an interest, and
the server device is additionally provided with a presentation information processor that determines whether or not the presentation information includes information of a field corresponding to the interest information, and if included, carries out processing that emphasizes the information in question.

10. The server device according to claim 2, wherein
the server device is additionally provided with a behavior information memory that stores the behavior information acquired by the behavior information acquirer, and
the influence calculator includes a past influence calculator that, with respect to the behavior information stored by the behavior information memory, extracts another user who has carried out a similar behavior after knowing that the person who carried out the behavior indicated by the behavior information is the user.

11. The server device according to claim 2, wherein the server device is additionally provided with an influence learner including at least either one of: a behavior list updater that updates the behavior list on the basis of the behavior information; or a user information updater that, on the basis of the behavior information, updates the user information representing the influence of the behaviors of the user and the another user when the another user has carried out a similar behavior after knowing that the person who carried out the behavior indicated by the behavior information is the user.

12. The server device according to claim 1, wherein
the user information memory additionally stores interest information indicating a field in which the user has an interest, and
the server device is additionally provided with a presentation information processor that determines whether or not the presentation information includes information of a field corresponding to the interest information, and if included, carries out processing that emphasizes the information in question.

13. The server device according to claim 1, wherein the server device is additionally provided with an influence learner including at least either one of: a behavior list updater that updates the behavior list on the basis of the behavior information; or a user information updater that, on the basis of the behavior information, updates the user information representing the influence of the behaviors of the user and the another user when the another user has carried out a similar behavior after knowing that the person who carried out the behavior indicated by the behavior information is the user.

14. A behavior promotion and suppression system comprising: a terminal device provided with a behavior detector that detects a behavior carried out by a user, generates behavior information including information representing the behavior carried out by the user and information identifying the user, and transmits the behavior information to a server device; and the server device including a behavior list memory that stores a behavior list indicating combinations of behaviors and subsequent possible behaviors of the user, a mutual information memory that stores mutual information representing connections between users, a user information memory that stores user information representing an influence of a behavior of the users, a behavior information acquirer that acquires the behavior information from the terminal device, a behavior information memory that stores the behavior information acquired by the behavior information acquirer an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof when the user has carried out the subsequent possible behavior, the influence including a percentage which infers that the another user carries out a similar behavior, and a presenter that generates, based on information pre-stored corresponding to the behavior and required to generate presentation information, presentation information including the influence the behavior in question has on the another user when the user has carried out the subsequent possible behavior, the influence having been calculated by the influence calculator, and presents the presentation information to the user; wherein the influence calculator includes a past influence calculator that, with respect to the behavior information stored by the behavior information memory, extracts another user who has carried out a similar behavior after knowing that the person who carried out the behavior indicated by the behavior information is the user.

15. A behavior promotion and suppression method comprising the following step to be executed by a terminal device: a behavior detection step in which a behavior carried out by a user is detected, behavior information including information representing the behavior carried out by the user and information identifying the user is generated and transmitted to a server device; and the following steps to be executed by the server device: a behavior information acquisition step in which the behavior information is acquired from the terminal device; a behavior information storage step in which the acquired behavior information is stored; an influence calculation step in which a subsequent possible behavior of the user who has carried out the behavior indicated in the behavior information acquired in the behavior information acquisition step is acquired from a behavior list indicating combinations of behaviors and subsequent possible behaviors of the user and stored by a behavior list memory, and in which the influence the behavior in question has on another user who has a connection with the user and has seen the behavior in question or the result thereof the user has carried out the subsequent possible behavior is calculated on the basis of mutual information that is stored by a mutual information memory and represents a connection between the users and user information that is stored by a user information memory and represents an influence of a behavior of the users, the influence including a percentage which infers that the another user carries out a similar behavior; and a presentation step in which, based on information pre-stored corresponding to the behavior and required to generate presentation information, the presentation information including the influence the behavior in question has on the another user when the user has carried out the subsequent possible behavior is generated, the influence having been calculated in the influence calculation step, and the presentation information is presented to the user; wherein the influence calculation step includes a past influence calculation step that, with respect to the behavior information stored, extracts another user who has carried out a similar behavior after knowing that the person who carried out the behavior indicated by the behavior information is the user.

16. A non-transitory computer-readable recording medium storing a program causing a computer to function as: a behavior list memory that stores a behavior list indicating combinations of behaviors and subsequent possible behaviors of a user; a mutual information memory that stores mutual information representing connections between users; a user information memory that stores user information representing an influence of a behavior of the users; a behavior information acquirer that acquires behavior information including information representing a behavior carried out by the user and information identifying the user; a behavior information memory that stores the behavior information acquired by the behavior information acquirer; an influence calculator that acquires, from the behavior list, a subsequent possible behavior of the user who has carried out the behavior indicated in the behavior information acquired by the behavior information acquirer, and on the basis of the mutual information and the user information, calculates the influence the behavior in question has on another user who has a connection with the user and has seen the behavior in question or the result thereof when the user has carried out the subsequent possible behavior, the influence including a percentage which infers that the another user carries out a similar behavior; and a presenter that generates, based on information pre-stored corresponding to the behavior and required to generate presentation information, the presentation information including the influence the behavior in question has on the another user when the user has carried out the subsequent possible behavior, the influence having been calculated by the influence calculator, and presents the presentation information to the user; wherein the influence calculator includes a past influence calculator that, with respect to the behavior information stored by the behavior information memory, extracts another user who has carried out a similar behavior after knowing that the person who carried out the behavior indicated by the behavior information is the user.

* * * * *